US009766892B2

(12) United States Patent
Chen et al.

(10) Patent No.: US 9,766,892 B2
(45) Date of Patent: Sep. 19, 2017

(54) METHOD AND APPARATUS FOR EFFICIENT EXECUTION OF NESTED BRANCHES ON A GRAPHICS PROCESSOR UNIT

(71) Applicant: INTEL CORPORATION, Santa Clara, CA (US)

(72) Inventors: Wei-Yu Chen, Santa Clara, CA (US); Guei-Yuan Lueh, San Jose, CA (US); Subramaniam Maiyuran, Gold River, CA (US)

(73) Assignee: Intel Corporation, Santa Clara, CA (US)

( * ) Notice: Subject to any disclaimer, the term of this patent is extended or adjusted under 35 U.S.C. 154(b) by 212 days.

(21) Appl. No.: 14/581,858

(22) Filed: Dec. 23, 2014

(65) Prior Publication Data

US 2016/0179535 A1 Jun. 23, 2016

(51) Int. Cl.
*G06F 15/76* (2006.01)
*G06F 9/44* (2006.01)
(Continued)

(52) U.S. Cl.
CPC ........ *G06F 9/30058* (2013.01); *G06F 9/3005* (2013.01); *G06F 9/3017* (2013.01);
(Continued)

(58) Field of Classification Search
None
See application file for complete search history.

(56) References Cited

U.S. PATENT DOCUMENTS

2005/0154864 A1 7/2005 Rubin et al.
2008/0052492 A1 2/2008 Stuttard et al.
(Continued)

OTHER PUBLICATIONS

Transmittal of the International Search Report and the Written Opinion of the International Searching Authority from Patent Cooperation Treaty Application No. PCT/US2015/062066, mailed Mar. 21, 2016, 10 pages.

(Continued)

*Primary Examiner* — Hyun Nam
(74) *Attorney, Agent, or Firm* — Nicholson De Vos Webster & Elliott LLP

(57) ABSTRACT

An apparatus and method for executing nested control flow instructions on a graphics processing unit (GPU). For example, one embodiment of a processor comprises: an execution unit having a plurality of channels to execute control flow instructions including fused control flow instructions comprising two or more consecutive control flow instructions fused into a single fused control flow instruction; and a branch unit to process the control flow instructions and to maintain a global counter indicating a nesting level of the control flow instructions, wherein to process a fused control flow instruction, the branch unit is to store a value N in a stack indicating a number of control flow instructions fused into the fused control flow instruction, the branch unit to subsequently read the value N from the stack upon execution of the fused control flow instruction and decrement the global counter by a value of N responsive to execution of the fused control flow instruction.

20 Claims, 23 Drawing Sheets

(51) Int. Cl.
 *G06F 9/30* (2006.01)
 *G06F 9/38* (2006.01)
 *G06F 9/46* (2006.01)
 *G06T 1/20* (2006.01)

(52) U.S. Cl.
 CPC ...... *G06F 9/30072* (2013.01); *G06F 9/30145* (2013.01); *G06F 9/3824* (2013.01); *G06F 9/3851* (2013.01); *G06F 9/3887* (2013.01); *G06F 9/46* (2013.01); *G06T 1/20* (2013.01)

(56) References Cited

U.S. PATENT DOCUMENTS

| | | | |
|---|---|---|---|
| 2008/0114975 A1 | 5/2008 | Yen | |
| 2009/0240931 A1* | 9/2009 | Coon | G06F 9/30054 712/234 |
| 2011/0093683 A1* | 4/2011 | Aurich | G06F 9/3005 712/208 |
| 2013/0290674 A1 | 10/2013 | George et al. | |
| 2014/0075165 A1* | 3/2014 | Chen | G06F 9/322 712/233 |
| 2014/0075418 A1* | 3/2014 | Bates | G06F 8/4441 717/129 |
| 2014/0181477 A1 | 6/2014 | Vaidya et al. | |
| 2014/0201352 A1* | 7/2014 | Bates | G06F 21/54 709/224 |
| 2016/0092239 A1* | 3/2016 | Maiyuran | G06F 9/321 712/233 |
| 2016/0092240 A1* | 3/2016 | Maiyuran | G06F 9/3887 712/234 |

OTHER PUBLICATIONS

International Preliminary Report on Patentability for Application No. PCT/US2015/062066, dated Jul. 6, 2017, 6 pages.

* cited by examiner

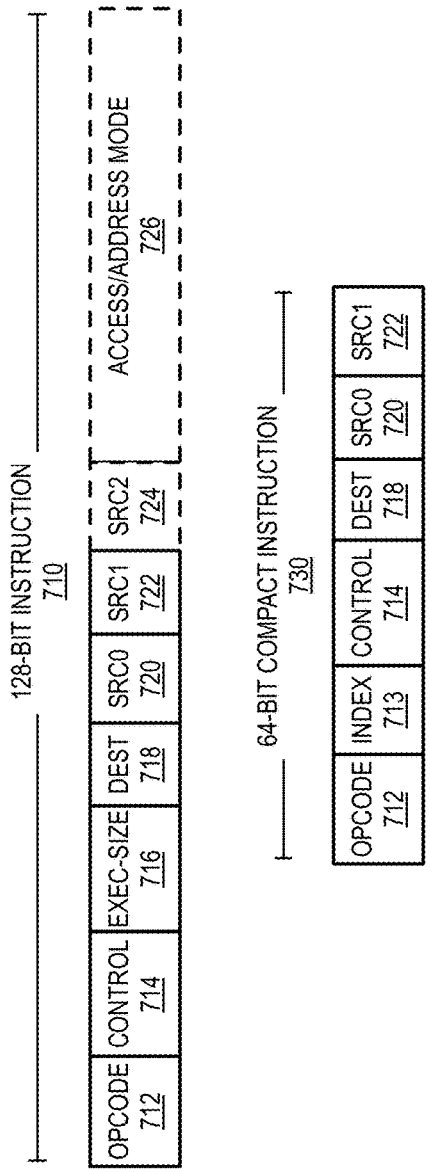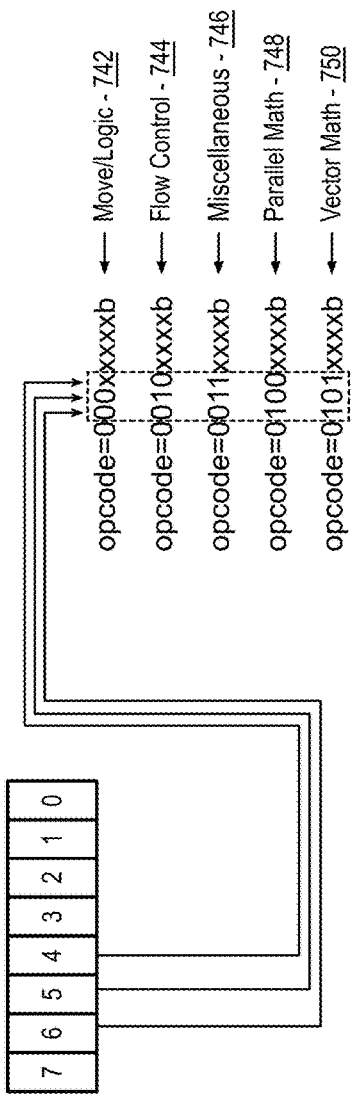
FIG. 7

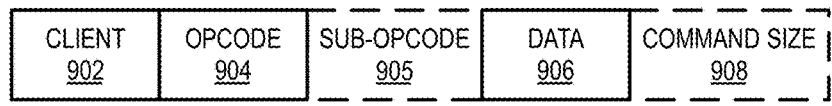
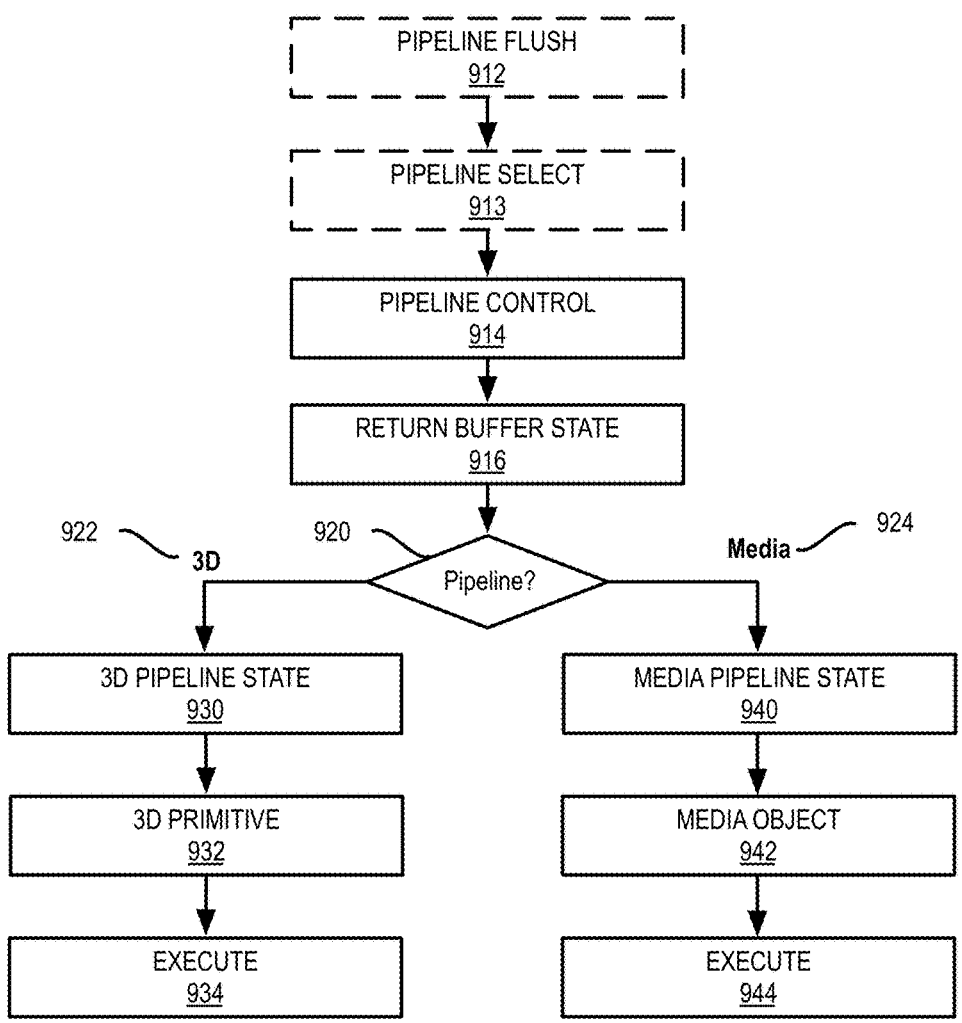

METHOD AND APPARATUS FOR EFFICIENT EXECUTION OF NESTED BRANCHES ON A GRAPHICS PROCESSOR UNIT

BACKGROUND

Field of the Invention

This invention relates generally to the field of computer processors. More particularly, the invention relates to an apparatus and method for efficient execution of nested branches on a graphics processor unit.

Description of the Related Art

Managing control flow in single instruction multiple data (SIMD) programs is a complex problem. Traditionally, graphics processing units (GPUs) use scalar code and program routines to control instruction pointer (IP) addresses for each SIMD channel. This is inefficient both in terms of performance and power usage.

Control flow is managed on some architectures by maintaining a unique IP address for each channel. For example, when a control flow instruction is encountered, the IP of each channel is updated with a particular IP based on the predicate mask of the instruction. For each and every instruction, the execution IP is compared to the channel's IP to determine if that channel is enabled for a particular instruction at the current IP.

BRIEF DESCRIPTION OF THE DRAWINGS

A better understanding of the present invention can be obtained from the following detailed description in conjunction with the following drawings, in which:

FIG. 7 illustrates a graphics processor execution unit instruction format according to an embodiment;

FIG. 9A is a block diagram illustrating a graphics processor command format according to an embodiment;

FIG. 9B is a block diagram illustrating a graphics processor command sequence according to an embodiment;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
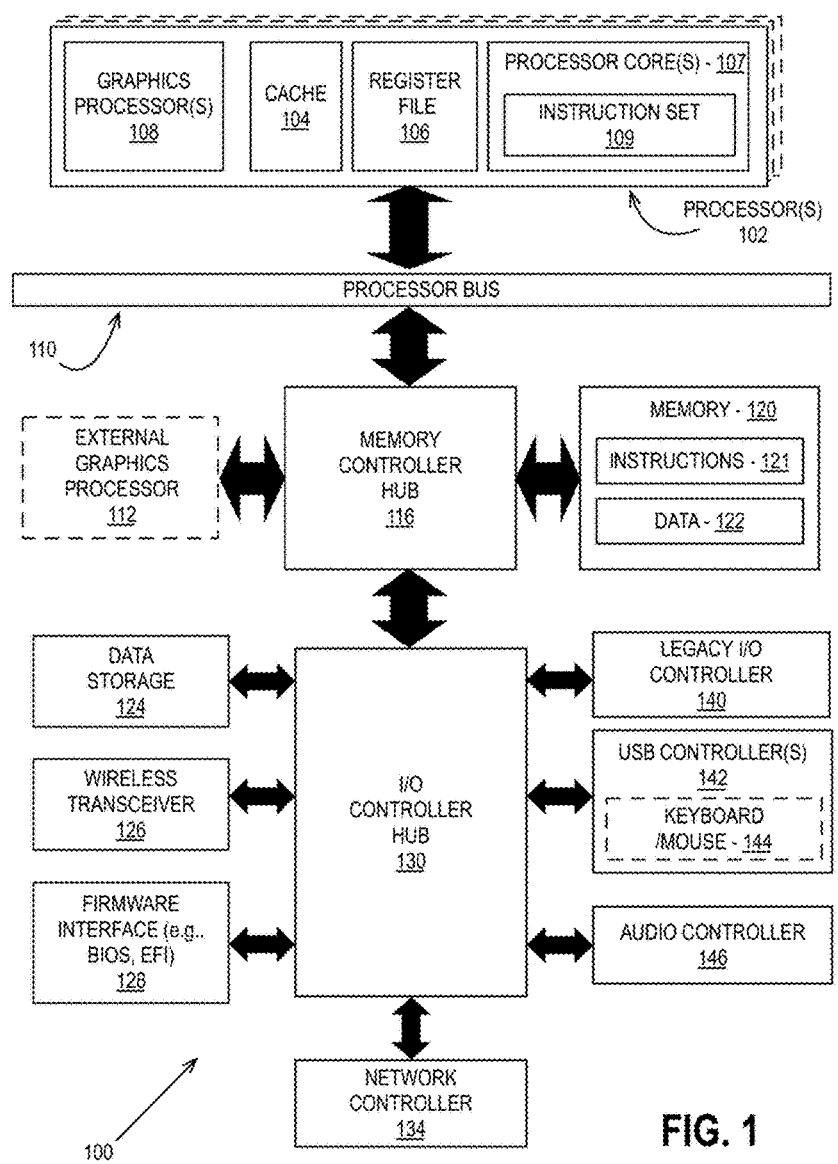
FIG. 1 is a block diagram of an embodiment of a computer system with a processor having one or more processor cores and graphics processors.

FIG. 1 is a block diagram of a data processing system 100, according to an embodiment. Data processing system 100 includes one or more processors 102 and one or more graphics processors 108, and may be a single processor desktop system, a multiprocessor workstation system, or a server system having a large number of processors 102 or processor cores 107. In on embodiment, the data processing system 100 is a system-on-a-chip (SoC) integrated circuit for use in mobile, handheld, or embedded devices.

An embodiment of data processing system 100 can include, or be incorporated within a server-based gaming platform, a game console, including a game and media console, a mobile gaming console, a handheld game console, or an online game console. In some embodiments, data processing system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such as a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit data signals between processor 102 and other components in system 100. System 100 uses an exemplary 'hub' system architecture, including a memory controller hub 116 and an input output (I/O) controller hub 130. Memory controller hub 116 facilitates communication between a memory device and other components of system 100, while I/O Controller Hub (ICH) 130 provides connections to I/O devices via a local I/O bus.

Memory device 120 can be a dynamic random access memory (DRAM) device, a static random access memory (SRAM) device, flash memory device, or some other memory device having suitable performance to serve as process memory. Memory 120 can store data 122 and instructions 121 for use when processor 102 executes a process. Memory controller hub 116 also couples with an optional external graphics processor 112, which may communicate with the one or more graphics processors 108 in processors 102 to perform graphics and media operations.

In some embodiments, ICH 130 enables peripherals to connect to memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110.

Figure 2:
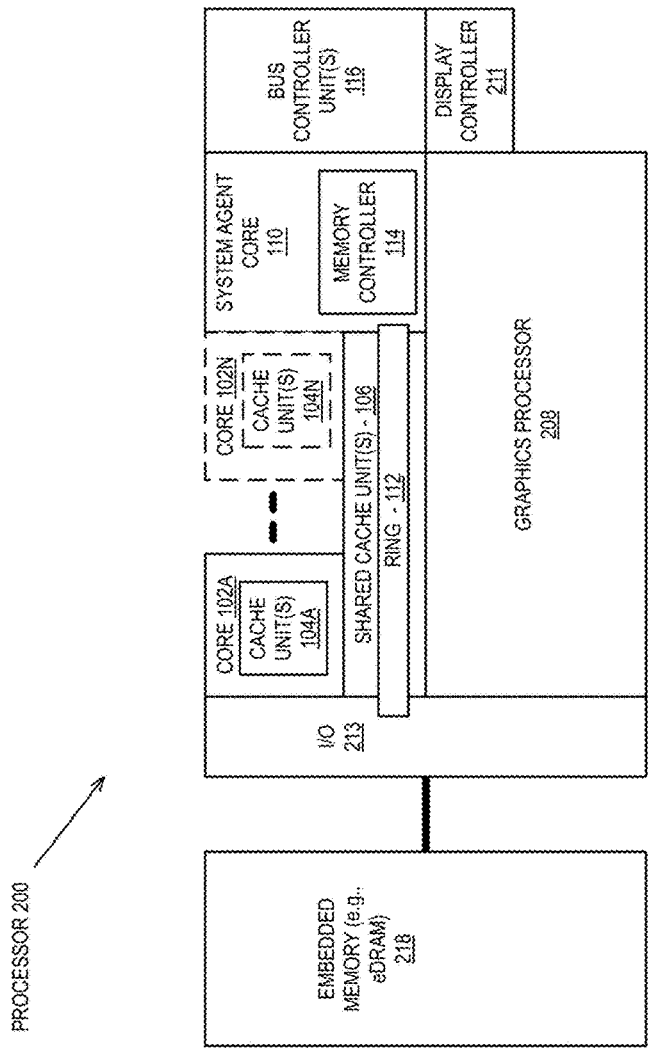
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of cores 202A-N includes one or more internal cache units 204A-N. In some embodiments each core also has access to one or more shared cached units 206.

The internal cache units 204A-N and shared cache units 206 represent a cache memory hierarchy within the processor 200. The cache memory hierarchy may include at least one level of instruction and data cache within each core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-N.

In some embodiments, processor 200 may also include a set of one or more bus controller units 216 and a system agent 210. The one or more bus controller units manage a set of peripheral buses, such as one or more Peripheral Component Interconnect buses (e.g., PCI, PCI Express). System agent 210 provides management functionality for the various processor components. In some embodiments, system agent 210 includes one or more integrated memory controllers 214 to manage access to various external memory devices (not shown).

In some embodiments, one or more of the cores 202A-N include support for simultaneous multi-threading. In such embodiment, the system agent 210 includes components for coordinating and operating cores 202A-N during multi-threaded processing. System agent 210 may additionally include a power control unit (PCU), which includes logic and components to regulate the power state of cores 202A-N and graphics processor 208.

In some embodiments, processor 200 additionally includes graphics processor 208 to execute graphics processing operations. In some embodiments, the graphics processor 208 couples with the set of shared cache units 206, and the system agent unit 210, including the one or more integrated memory controllers 214. In some embodiments, a display controller 211 is coupled with the graphics processor 208 to drive graphics processor output to one or more coupled displays. In some embodiments, display controller 211 may be separate module coupled with the graphics processor via at least one interconnect, or may be integrated within the graphics processor 208 or system agent 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the cores 202-N and graphics processor 208 use embedded memory modules 218 as a shared Last Level Cache.

In some embodiments, cores 202A-N are homogenous cores executing the same instruction set architecture. In another embodiment, cores 202A-N are heterogeneous in terms of instruction set architecture (ISA), where one or more of cores 202A-N execute a first instruction set, while at least one of the other cores executes a subset of the first instruction set or a different instruction set.

In some embodiments, processor 200 is a part of, or implemented on, one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, processor 200 can be implemented on one or more chips or as an SoC integrated circuit having the illustrated components, in addition to other components.

Figure 3:
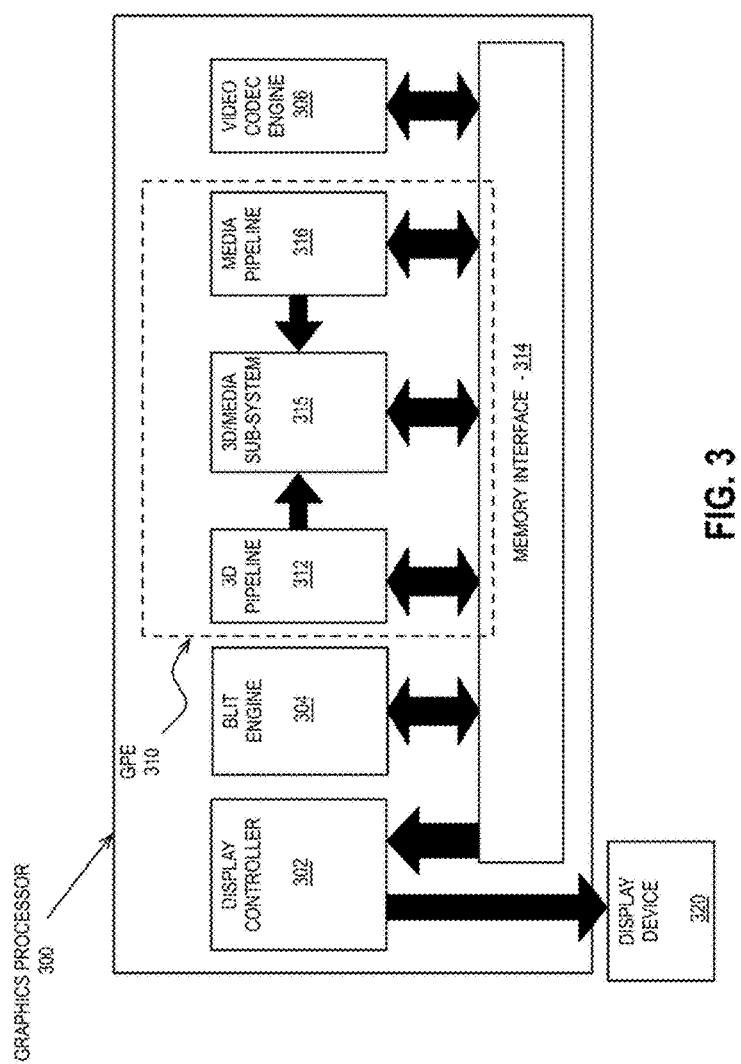
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of the graphics-processing engine (GPE) 310. In some embodiments, graphics-processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306.

In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
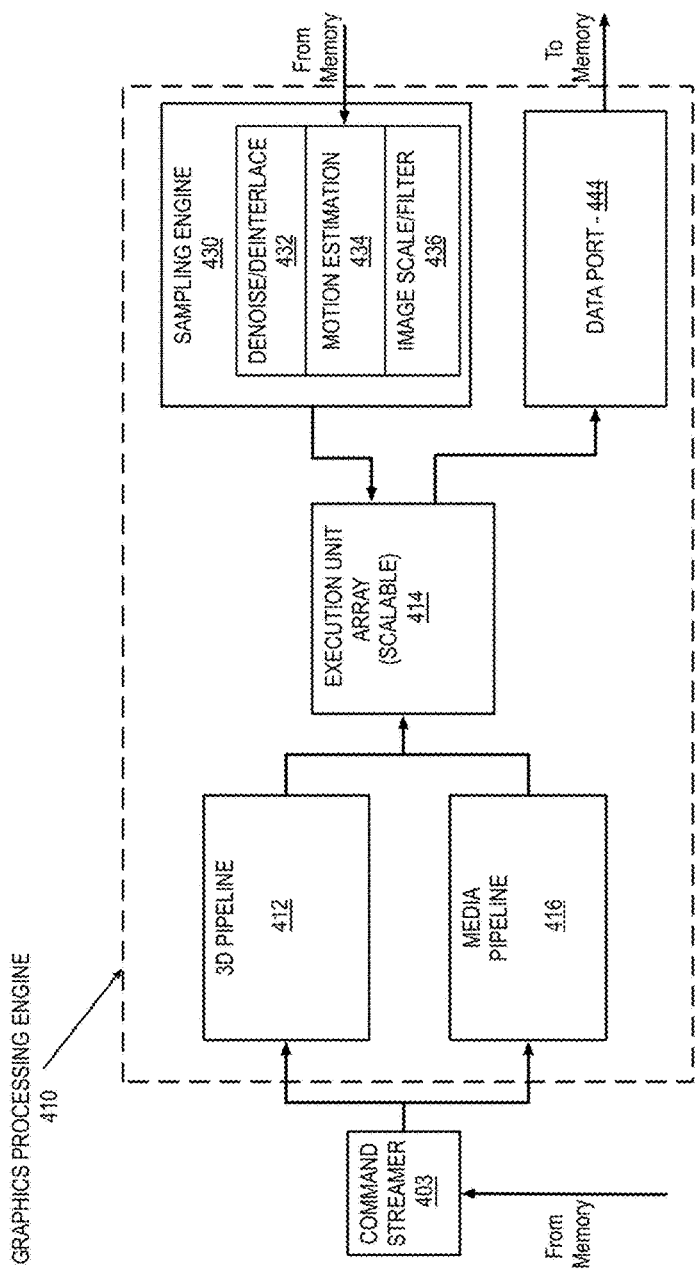
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The 3D and media pipelines process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
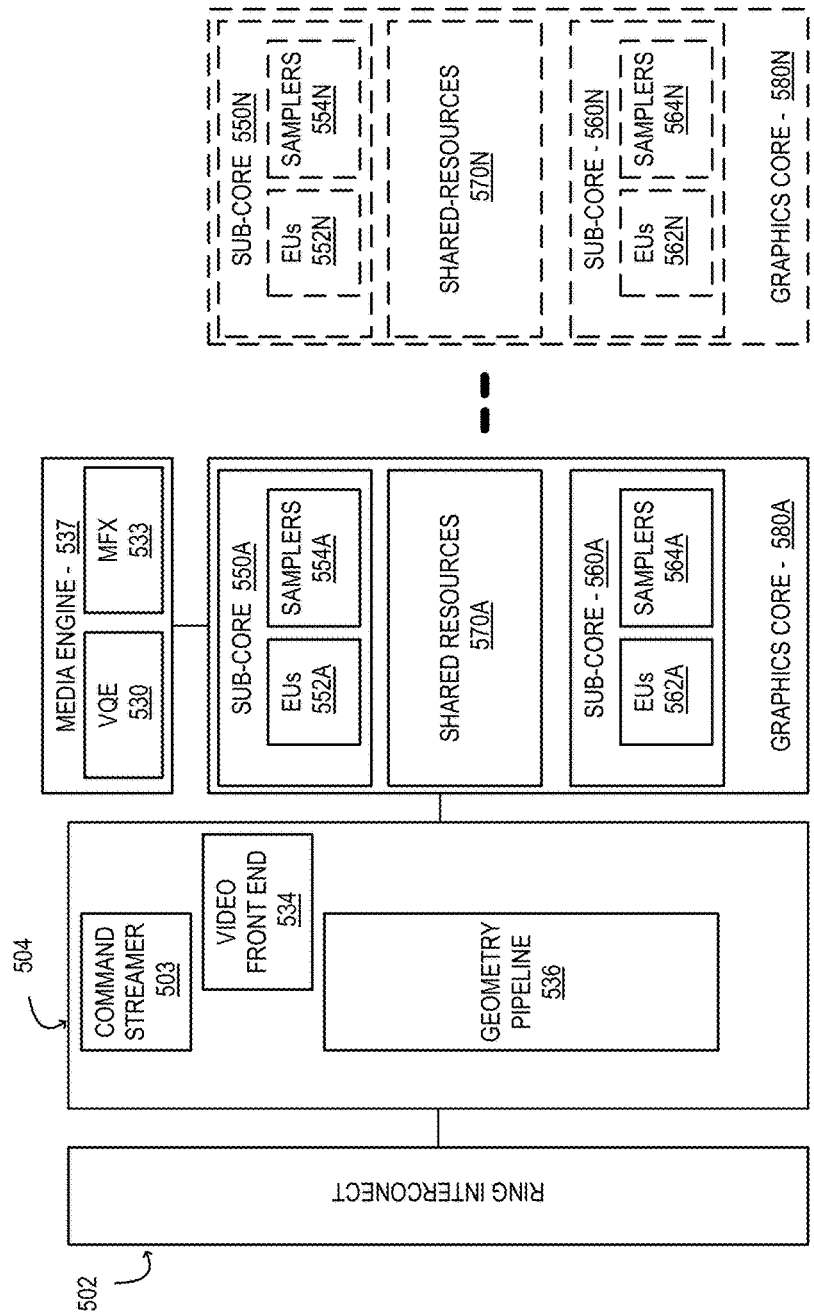
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-N (sometimes referred to as core slices), each having multiple sub-cores 550A-N, 560A-N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-N, each including a set of first sub-cores 550A-N and a set of second sub-cores 560A-N. Each sub-core in the set of first sub-cores 550A-N includes at least a first set of execution units 552A-N and media/texture samplers 554A-N. Each sub-core in the set of second sub-cores 560A-N includes at least a second set of execution units 562A-N and samplers 564A-N. In some embodiments, each sub-core 550A-N, 560A-N shares a set of shared resources 570A-N. In some embodiments, the shared resources include shared cache memory and pixel operation logic. Other shared resources may also be included in the various embodiments of the graphics processor.

Figure 6:
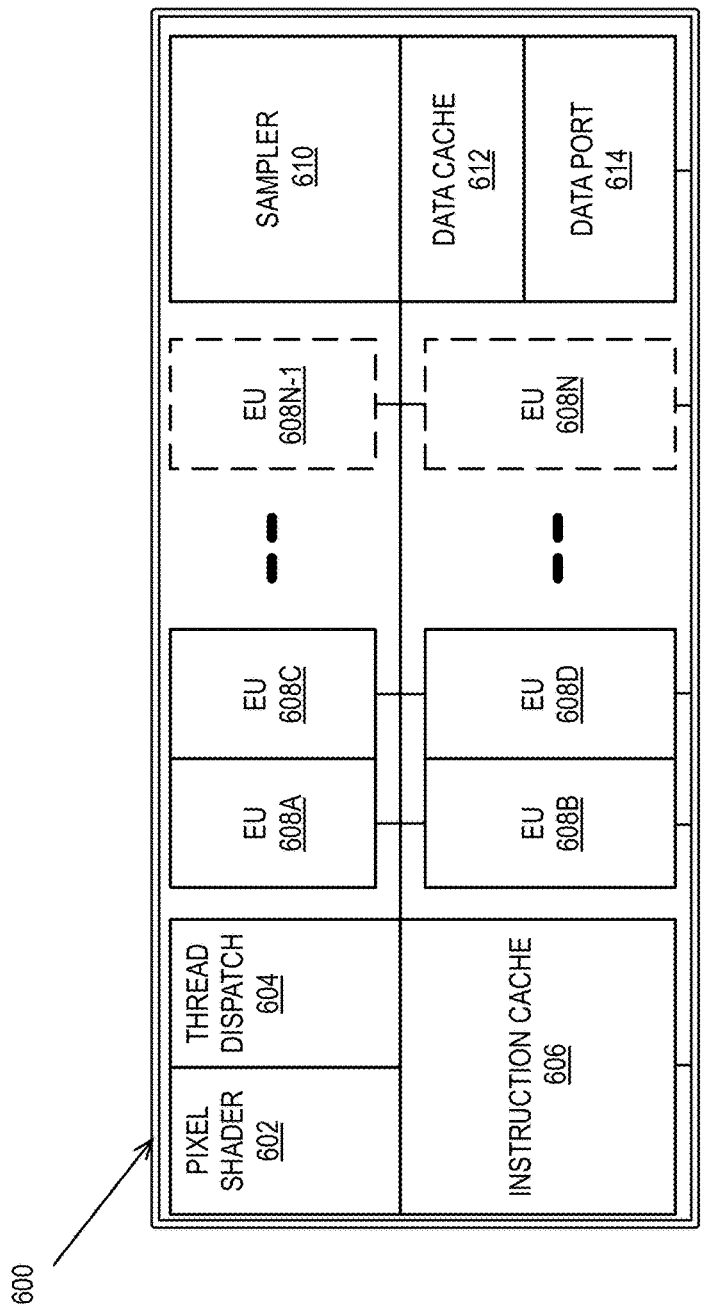
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-N. In some embodiments, each execution unit (e.g. 608A) is an individual vector processor capable of executing multiple simultaneous threads and processing multiple data elements in parallel for each thread. In some embodiments, execution unit array 608A-N includes any number individual execution units.

In some embodiments, execution unit array 608A-N is primarily used to execute "shader" programs. In some embodiments, the execution units in array 608A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an API-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 712 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes access/address mode information 726 specifying, for example, whether direct register addressing mode or indirect register addressing mode is used. When direct register addressing mode is used, the register address of one or more operands is directly provided by bits in the instruction 710. When indirect register addressing mode is used, the register address of one or more operands may be computed based on field 726, which specifies an address register value mode and/or an address immediate field in the instruction. In one embodiment the access/address mode information 726 may determine the operand mode to define a data access alignment for the instruction. For example, when in a first mode, the instruction 710 may use byte-aligned addressing for source and destination operands and, when in a second mode, the instruction 710 may use 16-byte-aligned access mode and 1-byte aligned addressing for all source and destination operands. access mode, where the byte alignment of the access mode determines the access alignment of the instruction operands.

In some embodiments instructions are grouped based on opcode bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb (e.g., 0x0x) and logic instructions are in the form of 0001xxxxb (e.g., 0x01). A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
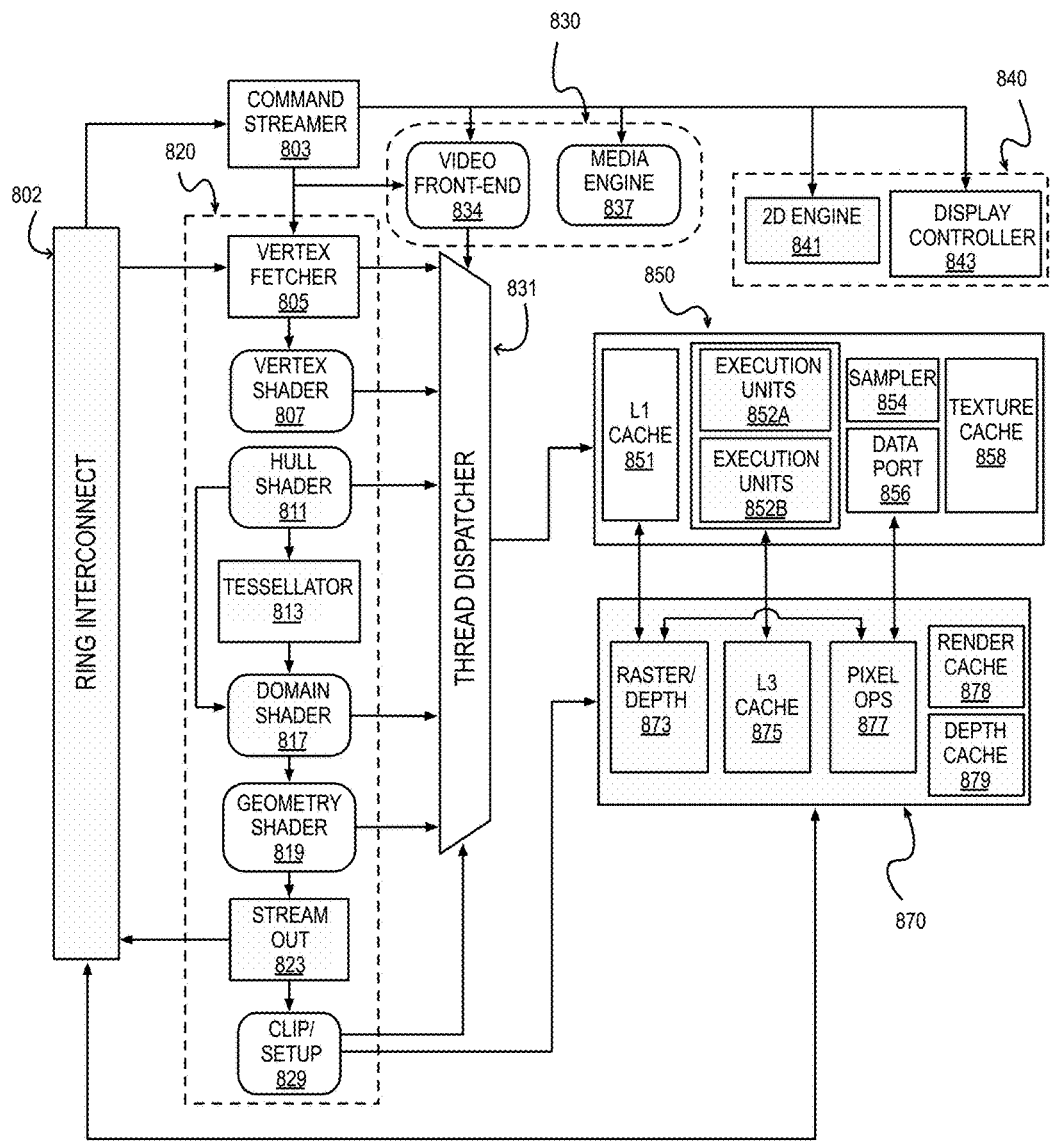
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access unrasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. Associated render and depth buffer caches 878, 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, sample command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, sample command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
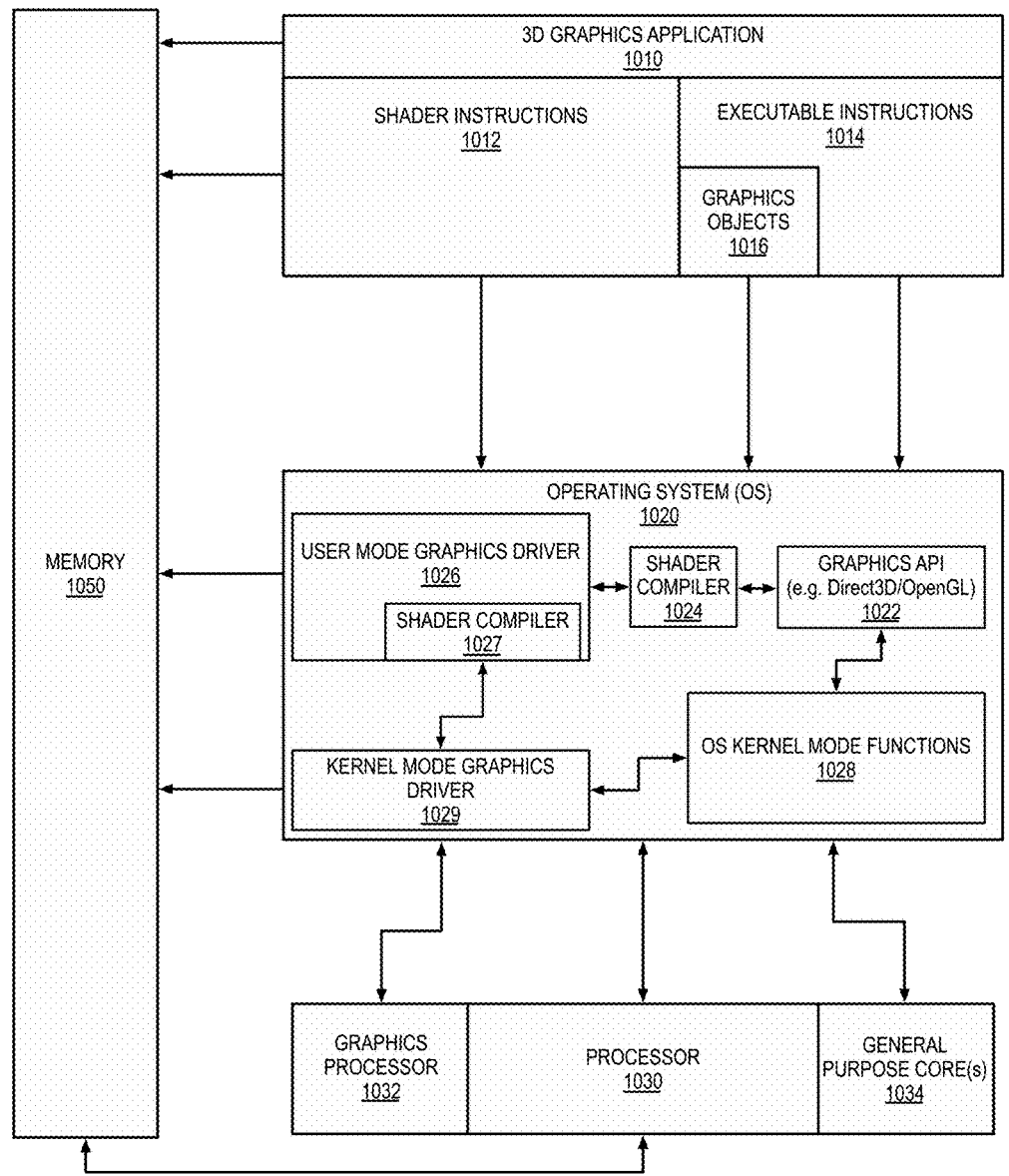
FIG. 10 illustrates exemplary graphics software architecture for a data processing system according to an embodiment.

FIG. 10 illustrates exemplary graphics software architecture 1000 for a data processing system according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

Apparatus and Method for SIMD Structured Branching

One embodiment of the invention performs SIMD control flow in hardware, thereby increasing performance and reducing power. In particular, a SIMD processor functional unit is described that can be used in SIMD threads where channels diverge and re-converge using structured flow. One example of channel divergence is an IF/ELSE/ENDIF sequence where, if the "IF" condition is met, the instruction stream diverges to a first instruction sequence, but if the "IF" condition is not met, the instruction stream diverges to a second instruction sequence (specified by the "ELSE" condition). Channel convergence occurs in response to the ENDIF statement (e.g., when all divergent instructions required by the "IF" and/or "ELSE" statements have been completed).

In one embodiment of the invention, channel divergence and convergence are detected by a new branch unit (e.g., via new instructions) which responsively enables and disables each channel. The branch unit may be shared across all threads in an execution unit (EU) and may compute the result of all structured control flow instructions for all channels in the processor.

One embodiment of the branch unit computes a channel mask, one bit per channel, to enable or disable channels during structured control flow processing. This removes the necessity to compare channel IPs for every instruction. In one embodiment, the channel mask is used as-is for all non-control flow instructions, which are processed by another unit.

In one embodiment, the channel enable mask is generated from a counter per channel which indicates if the channel is disabled, and if so, by what control flow instruction (i.e., IF/ELSE/ENDIF, CALL/RETURN, etc). This saves gates when compared with existing per-channel IP solution and saves compute cycles per instruction. The embodiments of the invention may be implemented with any structured control flow instructions supported by a standard (e.g., c/c++). This includes, by way of example and not limitation: IF/ELSE/ENDIF, DO/BREAK/CONTINUE/WHILE, CALL/RETURN, HALT, BRANCH, and may work with any other structured control flow instructions.

Recursion is also supported in one embodiment using a counter that differentiates occurrences of control flow instructions. In particular, in one embodiment, a "Control Instruction Count" is maintained for each branching type (IF/ELSE/ENDIF, DO/BREAK/CONTINUE/WHILE, CALL/RETURN, etc), which provides a count of the current level of nesting of that branching type. For example, a value of 2 for an IF branching type means two nested IF statements. In one embodiment, the Control Instruction Count is zero if the current IP is outside of any branching conditional blocks.

One embodiment also maintains a "Per Channel Count" to determine if a channel is enabled. If the Per Channel Count is 0, the channel is enabled. In one embodiment, when a channel is disabled, its corresponding count contains the value of the Control Instruction Count at which the channel was disabled along with an encoded ID representing the branching type. (e.g., IF, 2 for an IF branching type with 2 nested IF statements).

In one embodiment, an n-channel entry stack is used to store the address (IP) of converging instructions (e.g., for an IF instruction, the IP of the ENDIF instruction is stored). A Top of Stack pointer is maintained for each branching type to identify the IP for the converging instruction within the stack.

In addition, in one embodiment, each instruction contains a predicate mask. Each bit of the predicate mask represents one channel, and is used to determine if the channel takes the conditional or not. (e.g., for IF, a channel can either enter the IF block, or jump to the ELSE block). In one embodiment, only enabled channels are evaluated for execution.

Figure 11:
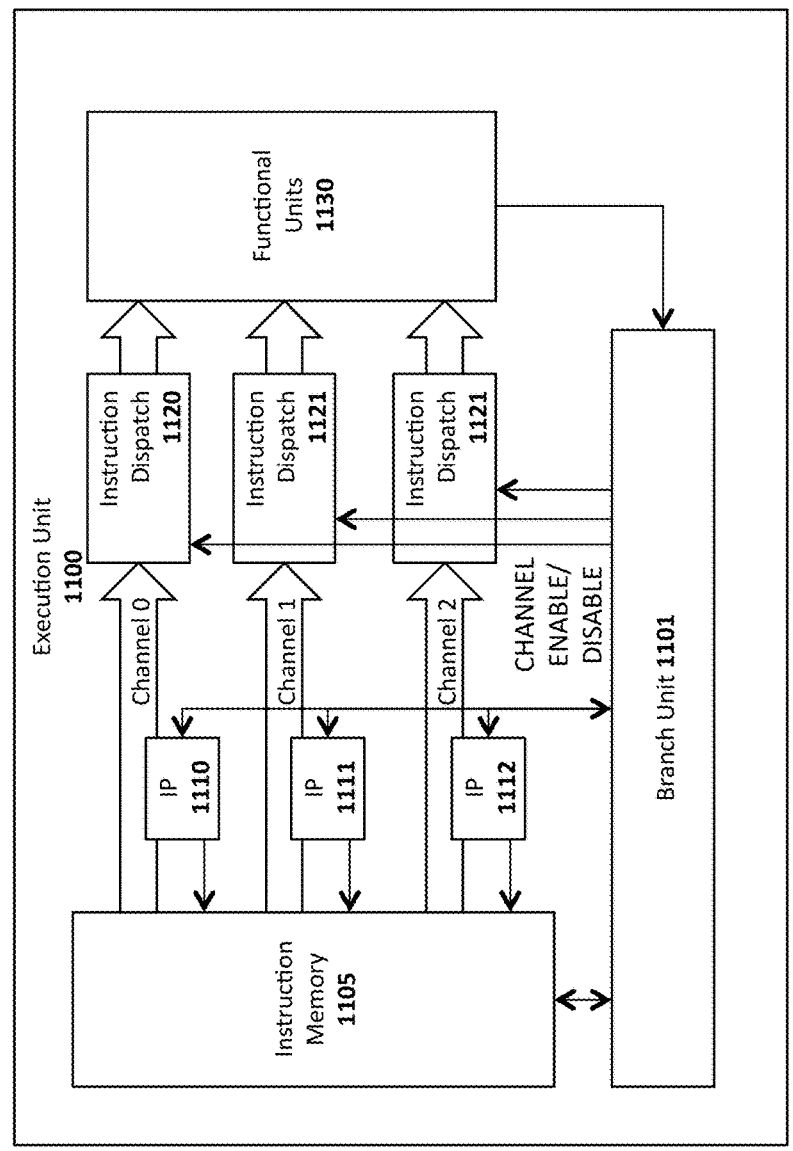
FIG. 11 illustrates one embodiment of a system architecture for performing SIMD branch operations.

FIG. 11 illustrates an architecture for an execution unit 1100 in which a branch unit 1101 is implemented in accordance with one embodiment of the invention. A plurality of channels 0-2 execute instructions stored in an instruction memory 1105 which may be an instruction buffer, instruction cache or any other memory suitable for storing instructions prior to execution. While 3 channels are illustrated in FIG. 11, the underlying principles of the invention may be implemented with any number of channels. An instruction pointer 1110-1112 associated with each channel 0-2, respectively, identifies the next instruction to be executed over its respective channel. Instruction dispatch logic 1120-1122 then dispatches the instructions for execution on a plurality of functional units 1130, which may include, for example, vector functional units, scalar functional units, and logical functional units (and/or any other type of functional unit designed to execute the instructions).

The execution unit 1100 shown in FIG. 11 may be implemented within a graphics processing unit architecture such as described above (see, e.g., execution units 608 shown in FIG. 6). However, the underlying principles of the invention are not limited to a graphics processing implementation.

As mentioned above, channel divergence and convergence are detected by the branch unit 1101 which responsively enables and disables each channel. The branch unit 1101 may be shared across all threads in the EU 1100 and may compute the result of all structured control flow instructions for all channels in the processor. In one embodiment, each thread is executed on a different channel 0-2.

Figure 12:
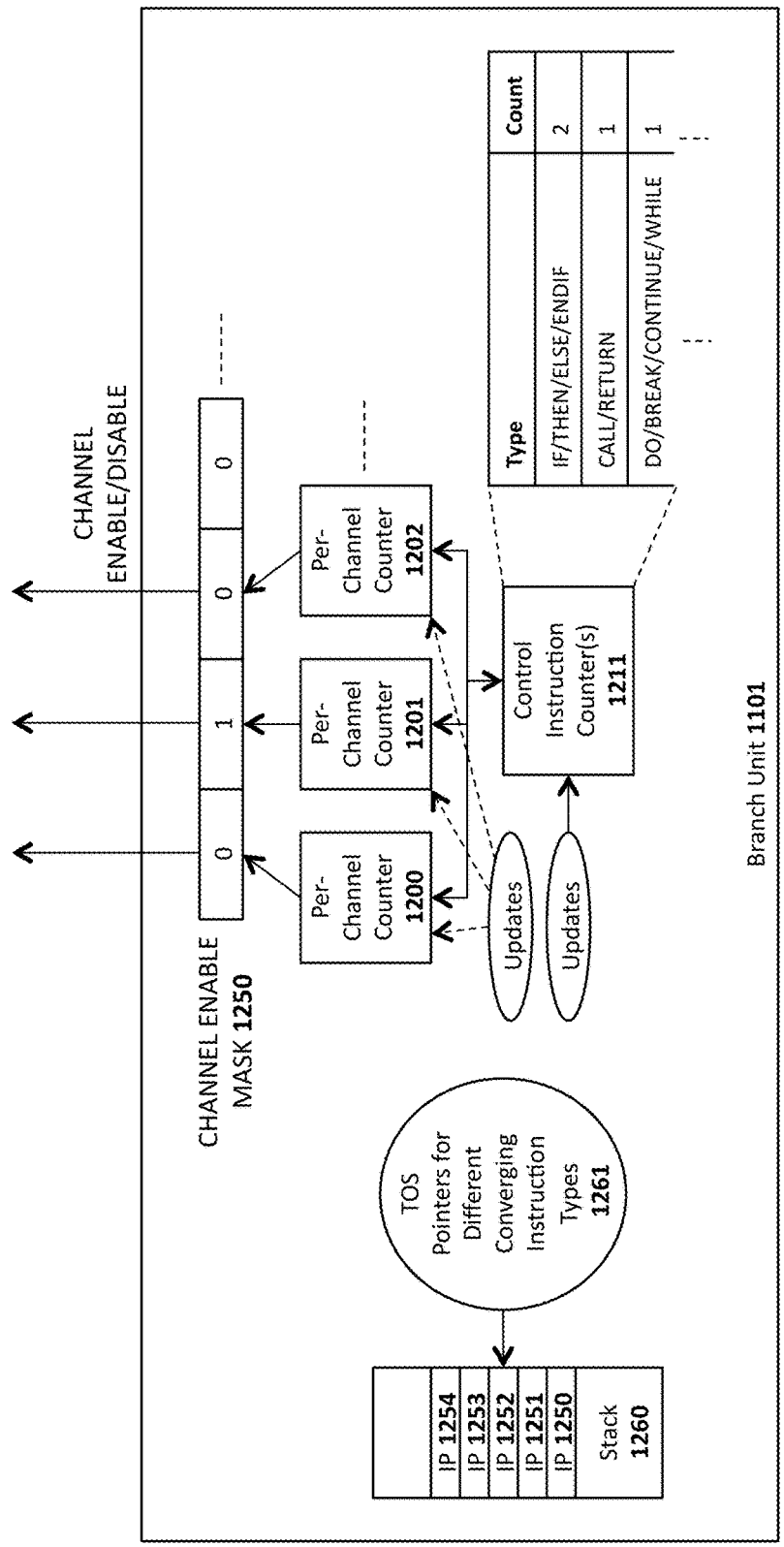
FIG. 12 illustrates a branch unit in accordance with one embodiment of the invention.

FIG. 12 illustrates additional details associated with one embodiment of the branch unit 1101. As illustrated, this embodiment of the branch unit 1101 computes a channel enable mask 1250, one bit per channel, to enable or disable channels during structured control flow processing (thereby removing the necessity to compare channel IPs for every instruction). In one embodiment, the channel mask 1250 is used as-is for all non-control flow instructions, which are processed by another unit.

In one embodiment, the channel enable mask 1250 is generated from a set of per-channel counters 1200-1202 which indicate whether the channel is disabled, and if so, by what control flow instruction (i.e., IF/ELSE/ENDIF, CALL/RETURN, etc). A set of control instruction counters 1211 differentiates occurrences of control flow instructions with a "control instruction count" maintained for each branching type (IF/ELSE/ENDIF, DO/BREAK/CONTINUE/WHILE, CALL/RETURN, etc). In one embodiment, the control instruction count indicates the current level of nesting of that branching type. In the example shown in FIG. 12, a value of 2 is shown for an IF branching type, meaning two nested IF statements. Values of 1 are shown for CALL/RETURN and DO/BREAK/CONTINUE/WHILE instructions indicating 1 level of nesting. In one embodiment, the control instruction count is zero if the current IP is outside of any branching conditional blocks.

In one embodiment, if the per channel count is 0 in a per-channel counter 1200-1202, then the corresponding channel is enabled, as indicated by a 0 in the channel mask 1250. In one embodiment, when a channel is disabled, its corresponding count in its per-channel counter 1200-1202 comprises the control instruction count at which the channel was disabled along with the encoded ID representing the branching type (provided by the control instruction counters 1211).

FIG. 12 also illustrates an n-channel entry stack 1260 used to store the address (IP) of converging instructions (e.g., for an IF instruction, the IP of the ENDIF instruction is stored). Top of stack pointers 1261 are maintained for each branching type to identify the IP 1250-1254 for the converging instruction within the stack 1260. In one embodiment, the IP of the converging instruction is added to the stack when executing the corresponding diverging instruction.

As mentioned, in one embodiment, each instruction contains a predicate mask where each bit represents one channel, and is used to determine if the channel takes the conditional or not (e.g., for IF, a channel can either enter the IF block, or jump to the ELSE block). In one embodiment, only enabled channels are evaluated for execution.

Figure 13:
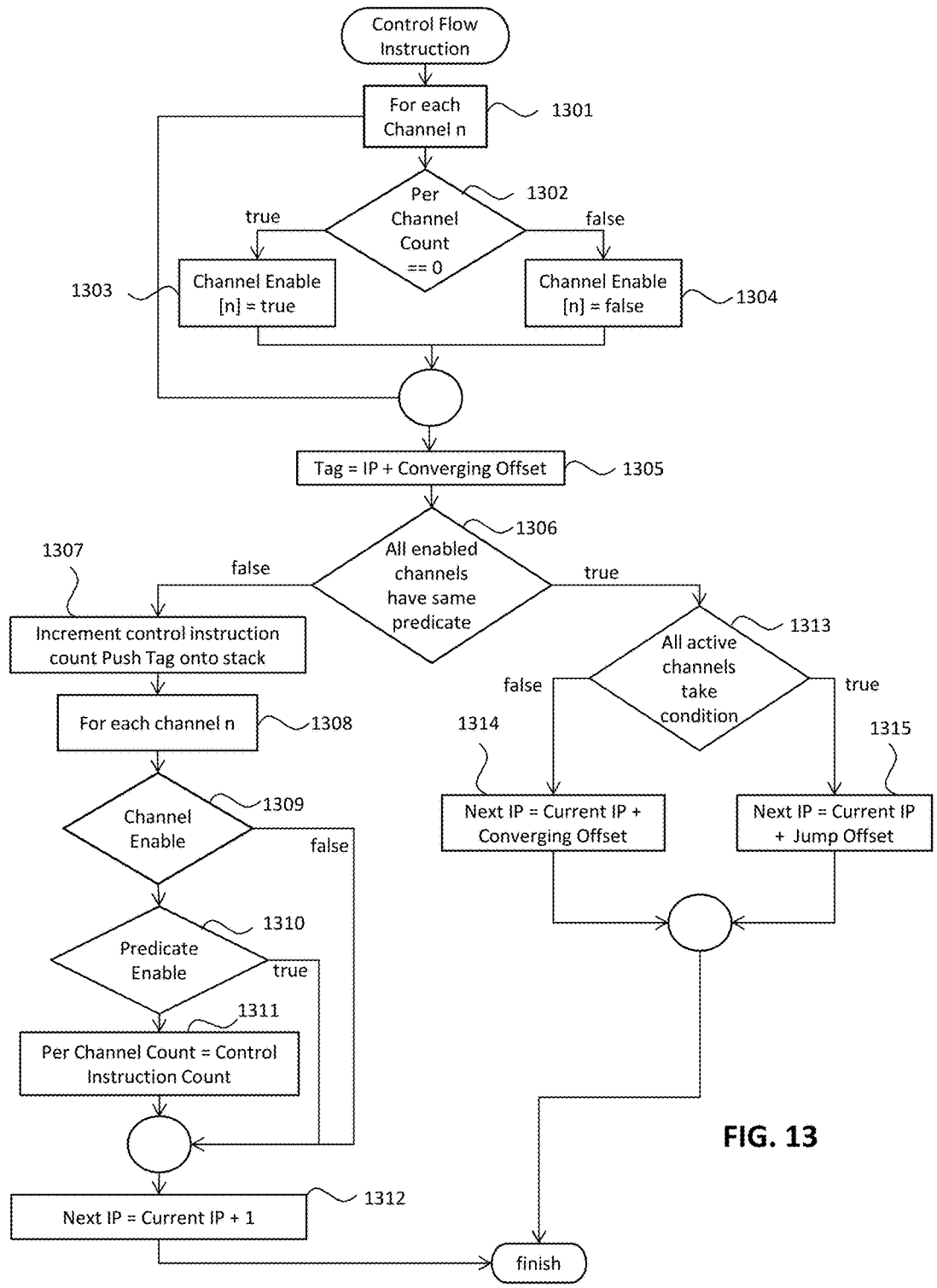
FIG. 13 illustrates a method for processing diverging control flow instructions in accordance with one embodiment of the invention.

A method for executing diverging instructions is set forth in FIG. 13. The method may be implemented within the context of the system shown in FIGS. 11-12 but is not limited to any particular system architecture.

Starting at 1301, for each channel n, a determination is made at 1302 as to whether the per channel count is 0. As mentioned, in one embodiment, a channel count of 0 indicates that the corresponding channel is enabled, determined at 1303. If the per channel count is non-zero, the corresponding channel is not enabled, determined at 1304. The above process is performed for each channel n.

At 1305 a tag for the converging IP is set equal to the current IP+ the converging offset (i.e., the distance from the current IP to the converging IP). At 1306, a determination is made as to whether all enabled channels have the same predicate value associated therewith (e.g., whether the predicate mask of the instructions are the same). If not, then at 1307, the control instruction count is incremented for the current control flow instruction type (e.g., the IF count is incremented within the corresponding control instruction counter 1211).

At 1308, for each channel n, a determination is made as to whether the channel is enabled at 1309. If so, then at 1310 a determination is made as to whether the channel is enabled for the current instruction based on the predicate enable field. If not, then the per channel count is set equal to the control instruction count for the control flow instruction at 1311 (thereby disabling the channel). The above process is repeated for each channel n. At 1312, the next instruction pointer is incremented (e.g., the next instruction pointer is set equal to the current instruction pointer+1).

Turning back to decision block 1306, if all enabled channels have the same predicate value associated therewith (i.e., the predicate mask of the instructions are the same), then at 1313, a determination is made as to whether all active channels take the current condition (e.g., whether all channels can process the control flow instruction). If so, then at 1315 the next instruction pointer is set equal to the current instruction pointer added to the jump offset (i.e., the IP location of the diverging instruction). If not, then at 1314 the next instruction pointer is set equal to the current instruction pointer added to the converging offset (i.e., the location of the converging instruction).

As a result of the foregoing method, if the predicate is uniform for all channels, then the per channel count is not updated, and only the Execution IP is updated. If the predicate mask is not uniform for all channels, this is called divergence and, in this case, some channels take the condition and some do not. In this instance, the control instruction count is incremented, and the per channel count of each channel which does not take the condition is updated with the control instruction count of the current branching type. The Tag is pushed onto the stack (to store the IP of the converging instruction), and the top of stack pointer is updated.

Figure 14:
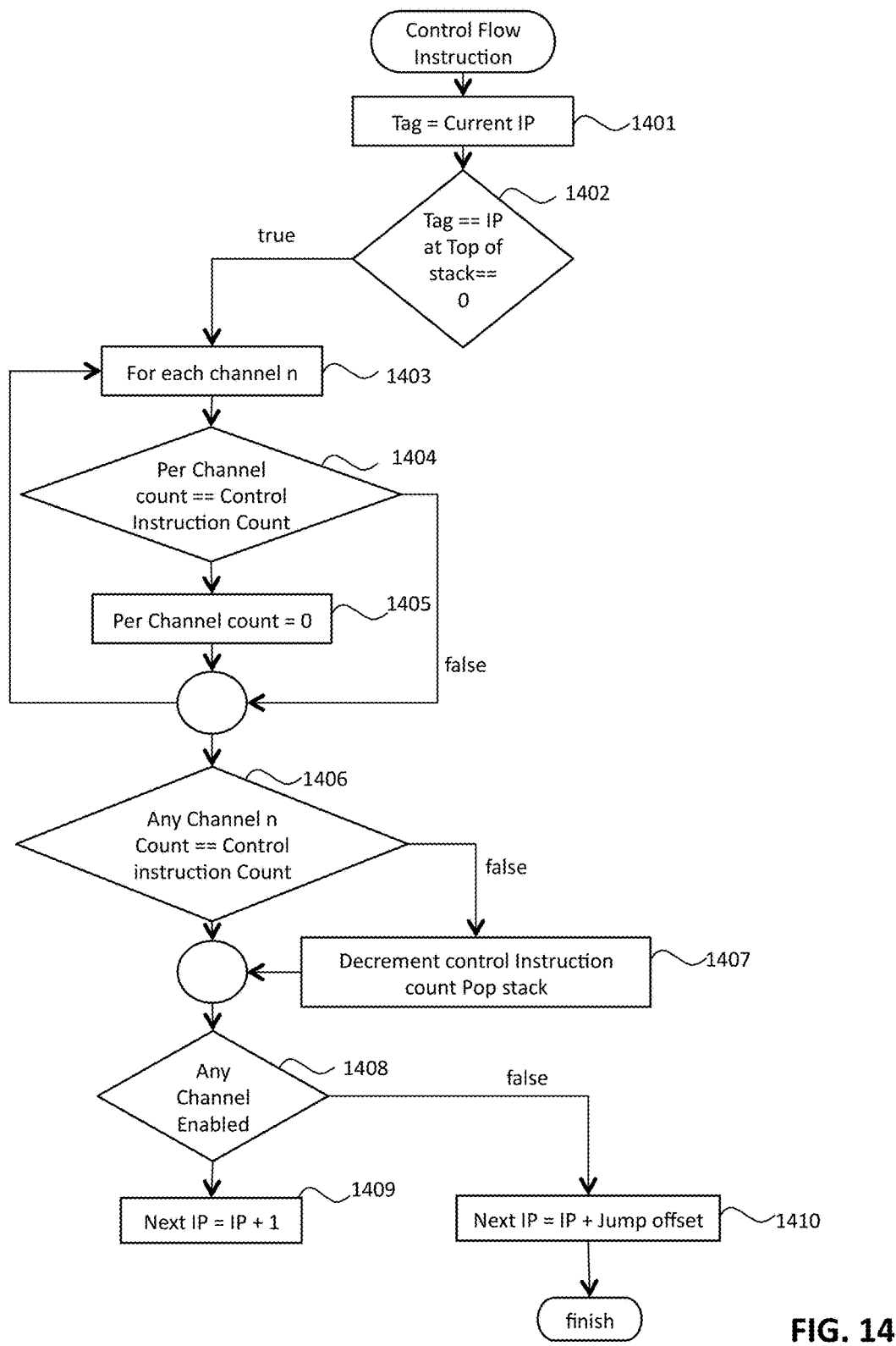
FIG. 14 illustrates a method for processing converging control flow instructions in accordance with one embodiment of the invention.

FIG. 14 illustrates one embodiment of a method for processing converging control flow instructions. The method may be implemented within the context of the processor architecture shown in FIGS. 11-12 but is not limited to any particular architecture.

At 1401, a tag is set equal to the current instruction pointer. At 1402, if the tag is equal to the instruction pointer at the top of the stack (e.g., stack 1260), then the process moves to 1403. For each channel n, if the per channel count is equal to the control instruction count, determined at 1404, then the per channel count is set equal to 0 at 1405 (enabling the channel).

Once the process completes for each channel, at 1406 a determination is made as to whether any channel count is equal to the control instruction count. If not, then at 1407, the control instruction count is decremented and the instruction pointer is popped from the stack. At 1408 a determination is made as to whether any channel is enabled. If so, then at 1409 the instruction pointer is incremented (i.e., the next instruction pointer is set to the current instruction pointer+1). If not, then at 1410, the next instruction pointer is set equal to the current instruction pointer added to the jump offset (i.e., to arrive at the IP for the divergent control flow instruction).

As a result of the foregoing method, the current IP is compared to the Top of Stack IP. If those values match, then each per channel count is compared to the branching type's control instruction count, for channels with an enabled predicate mask bit. If these values match, the per channel count is set to 0 (indicating an active channel). If all channels are enabled corresponding to a particular control instruction count, then the count is decremented and the stack is popped. The IP is incremented and the program continues as normal.

Apparatus and Method for Unstructured Control Flow for a SIMD Execution Engine

As mentioned above, unstructured control flow is not currently supported in hardware for SIMD programs. Modern compilers produce unstructured SIMD program code which is traditionally converted back to structured program code by the compiler, and some optimizations are lost due to converting back to structured flow.

To address this limitation, one embodiment of the invention supports unstructured control flow instructions for SIMD programs in hardware, thereby maintaining the compiler optimizations which improves performance and reduces power. In particular, a branch unit may be equipped with logic to implement both the structured branching embodiments (described above) and unstructured branching embodiments (described below). It should be noted, however, that the structured branching techniques described above are not required for implementing the unstructured branching techniques described below (i.e., the unstructured branching techniques may be implemented in a branch unit with or without the structured branching techniques).

Figure 15:
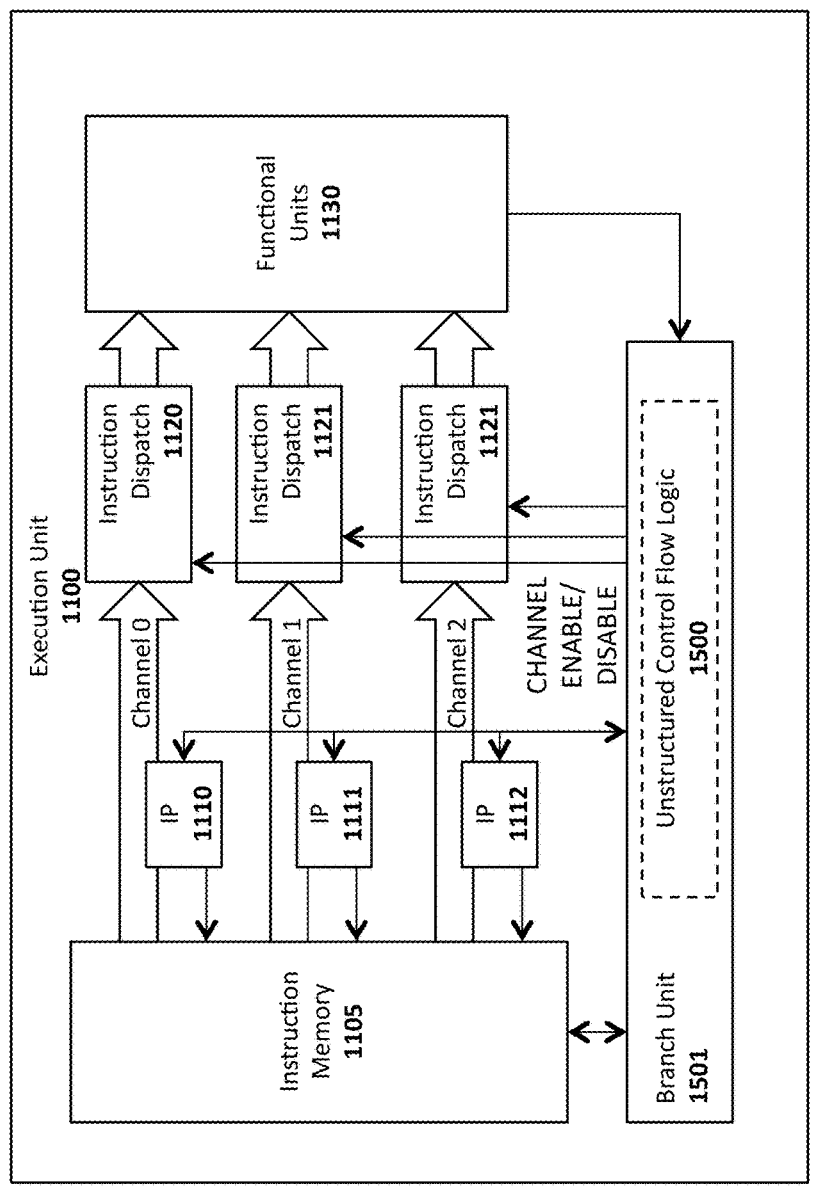
FIG. 15 illustrates one embodiment of a branch unit with unstructured control flow logic.

As illustrated in FIG. 15, in one embodiment, the branch unit 1501 includes unstructured control flow logic 1500 to support new unstructured control flow instructions. The unstructured control flow logic 1500 may be used in SIMD threads where channels diverge and re-converge using unstructured control flow. Channel divergence and convergence is may be detected from new instructions and the branch unit 1501 manages enables for each channel as described below.

As in the structured control flow embodiments, a plurality of channels 0-2 execute instructions stored in an instruction memory 1105 which may be an instruction buffer, instruction cache or any other memory suitable for storing instructions prior to execution. While three channels are illustrated in FIG. 15, the underlying principles of the invention may be implemented with any number of channels. An instruction pointer 1110-1112 associated with each channel 0-2, respectively, identifies the next instruction to be executed over its respective channel. Instruction dispatch logic 1120-1122 then dispatches the instructions for execution on a plurality of functional units 1130, which may include, for example, vector functional units, scalar functional units, and logical functional units (and/or any other type of functional unit designed to execute the instructions). The execution unit 1100 shown in FIG. 15 may be implemented within a graphics processing unit architecture such as described above (see, e.g., execution units 608 shown in FIG. 6). However, the underlying principles of the invention are not limited to a graphics processing implementation.

As mentioned above, channel divergence and convergence are detected by the branch unit 1101 which responsively enables and disables each channel. The branch unit 1101 may be shared across all threads in the EU 1100 and may compute the result of all unstructured control flow instructions for all channels in the processor. In one embodiment, each thread is executed on a different channel 0-2.

Figure 16:
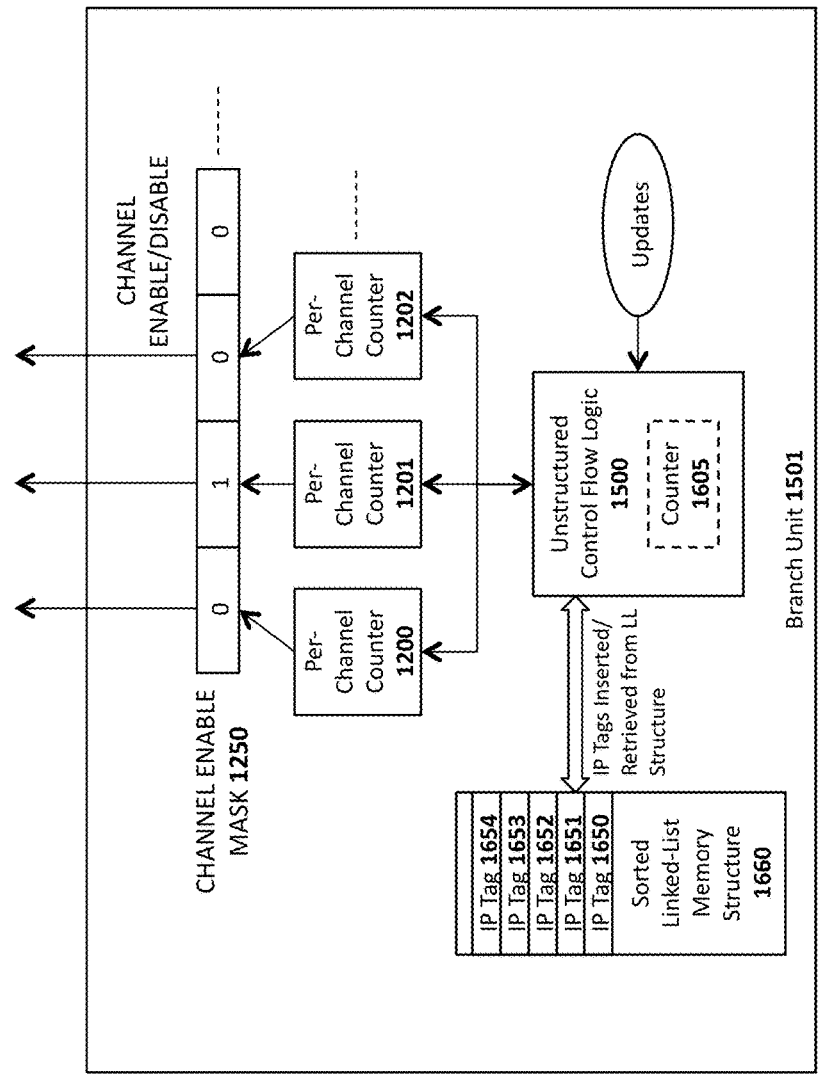
FIG. 16 illustrates additional details of one embodiment of the branch unit.

FIG. 16 provides additional details for implementing unstructured control flow including a channel mask 1250 to enable and disable channels. The channel mask 1250 may be computed for both structured and unstructured control flow instructions by the branch unit 1501 and may be used as-is for all non-control flow instructions, which are processed by another unit. In one embodiment, two new instructions are added for unstructured control flow, GOTO and JOIN, and a new counter 1605 is added to process these new instructions. In one embodiment, GOTO causes a jump to a specified location in the instruction stream and JOIN returns to a specified location in the instruction stream (e.g., both specified via an address/instruction pointer).

In the embodiments described above related to SIMD structured branching, the branch unit 1501 has defined a Control Instruction Count per branching type (e.g., IF/THEN/ENDIF, BREAK/WHILE/CONTINUE, CALL/RETURN, etc), which is a count of the current level of nesting of that branching type. In one embodiment, this mechanism is modified to handle unstructured instructions. Instead of using a count as the unique identifier, this embodiment uses the address of the IP tag in the local memory. While the unstructured instructions used a stack structure 1260 shown in FIG. 12 (top of stack being the last address pushed onto the stack), the new unstructured instructions use a sorted linked-list structure 1660 to store IP tags 1650-1654 in the same memory space as shown in FIG. 16. One difference with the stack structure 1260 is that in the sorted linked-list structure 1660 the unstructured instruction IP tags 1650-1654 are sorted by hardware (while in the stack structure the structured IPs are sorted by definition).

The existing Per Channel Count maintained in per channel counters 1200-1202 is used to determine if a channel is enabled. If the Per Channel Count is 0, the channel is enabled. In one embodiment, when a channel is disabled by an unstructured instruction its corresponding count is updated to contain the address of the IP tag 1650-1654 at which the channel was disabled along with an encoded ID representing the branching type (e.g., "GOTO2" to identify the GOTO instruction and IP tag at entry #2 in the linked list memory 1660 structure 1660).

As in the prior embodiments, each instruction may include a predicate mask. Each bit in the predicate mask represents one channel, and is used by the unstructured control flow logic 1500 of the branch unit 1501 to determine if the channel takes the conditional or not. Only enabled channels are evaluated for execution.

Figure 17:
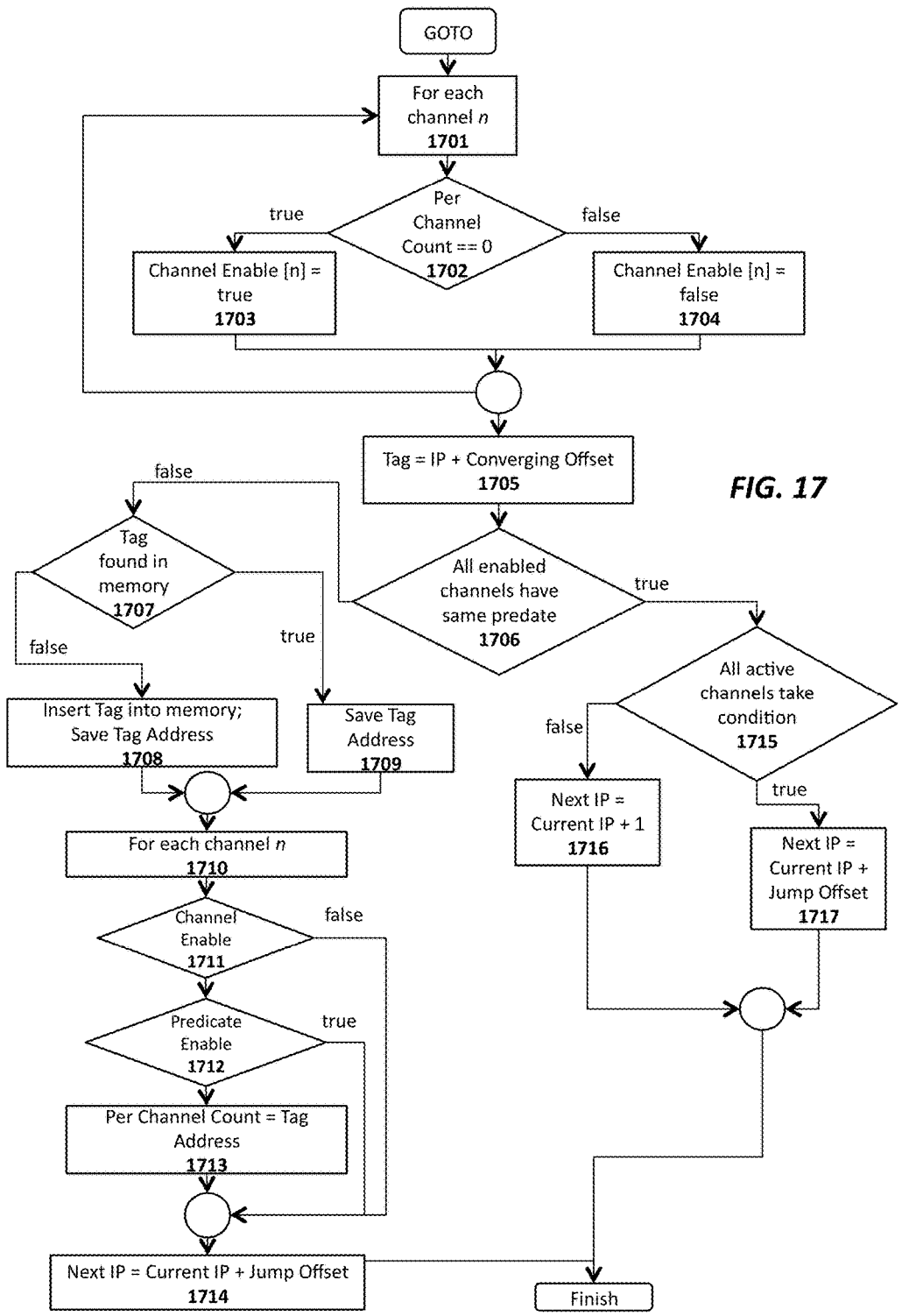
FIG. 17 illustrates a method for processing unstructured diverging control flow instructions in accordance with one embodiment of the invention.

One embodiment of a method for executing unstructured diverging instructions is set forth in FIG. 17. The method may be implemented within the context of the system shown in FIGS. 15-16 but is not limited to any particular system architecture.

Starting at 1701, for each channel n, a determination is made at 1702 as to whether the per channel count is 0. As mentioned, in one embodiment, a channel count of 0 indicates that the corresponding channel is enabled, determined at 1703. If the per channel count is non-zero, the corresponding channel is not enabled, determined at 1704. The above process is performed for each channel n.

At 1705 a tag for the converging IP is set equal to the current IP+ the converging offset (i.e., the distance from the current IP to the IP of the converging instruction). At 1706, a determination is made as to whether all enabled channels have the same predicate value associated therewith (e.g., whether the predicate mask of the instructions are the same). If not, then at 1707, the sorted linked list memory structure (e.g., 1660 in FIG. 16) is searched to determine whether the IP tag is found in the memory. If not, then at 1708, the tag is inserted into the memory and the tag address is saved (e.g., into a temporary storage such as counter 1606 accessible by the unstructured control flow logic 1500). If the IP tag is found in the memory, then at 1709 the tag address is saved.

Starting at 1710, for each channel n, a determination is made as to whether the channel is enabled at 1711. If so, then at 1712 a determination is made as to whether the channel is enabled for the current instruction based on the predicate enable field of the instruction. If not, then the per channel count is set equal to the tag address (identifying the IP tag within the memory 1660). In one embodiment, the tag address is stored in the corresponding Per Channel Counter 1200-1202 for the current channel n (thereby disabling the channel). The above process is repeated for each channel n. At 1714, the next instruction pointer is set by adding the jump offset to the current instruction pointer (i.e., to arrive at the IP address of the diverging instruction).

Turning back to decision block 1706, if all enabled channels have the same predicate value associated therewith (i.e., the predicate mask of the instructions are the same), then at 1715, a determination is made as to whether all active channels take the current condition (e.g., whether all channels can process the control flow instruction). If so, then at 1717 the next instruction pointer is set equal to the current instruction pointer added to the jump offset (i.e., the IP location of the diverging instruction). If not, then at 1716 the instruction pointer is incremented, i.e., the next instruction pointer is set equal to the current instruction pointer+1 (i.e., the diverging instruction is not taken).

As a result of the foregoing method, if the predicate is uniform for all channels, then the per channel count is not updated, and only the Execution IP is updated. If the predicate mask is not uniform for all channels, this is called divergence and, in this case, some channels take the condition and some do not. In this instance, the control instruction count is incremented, and the per channel count of each channel which does not take the condition is updated with the memory address of the converging IP. The IP Tag 1650-1654 is inserted into memory 1660.

Figure 18:
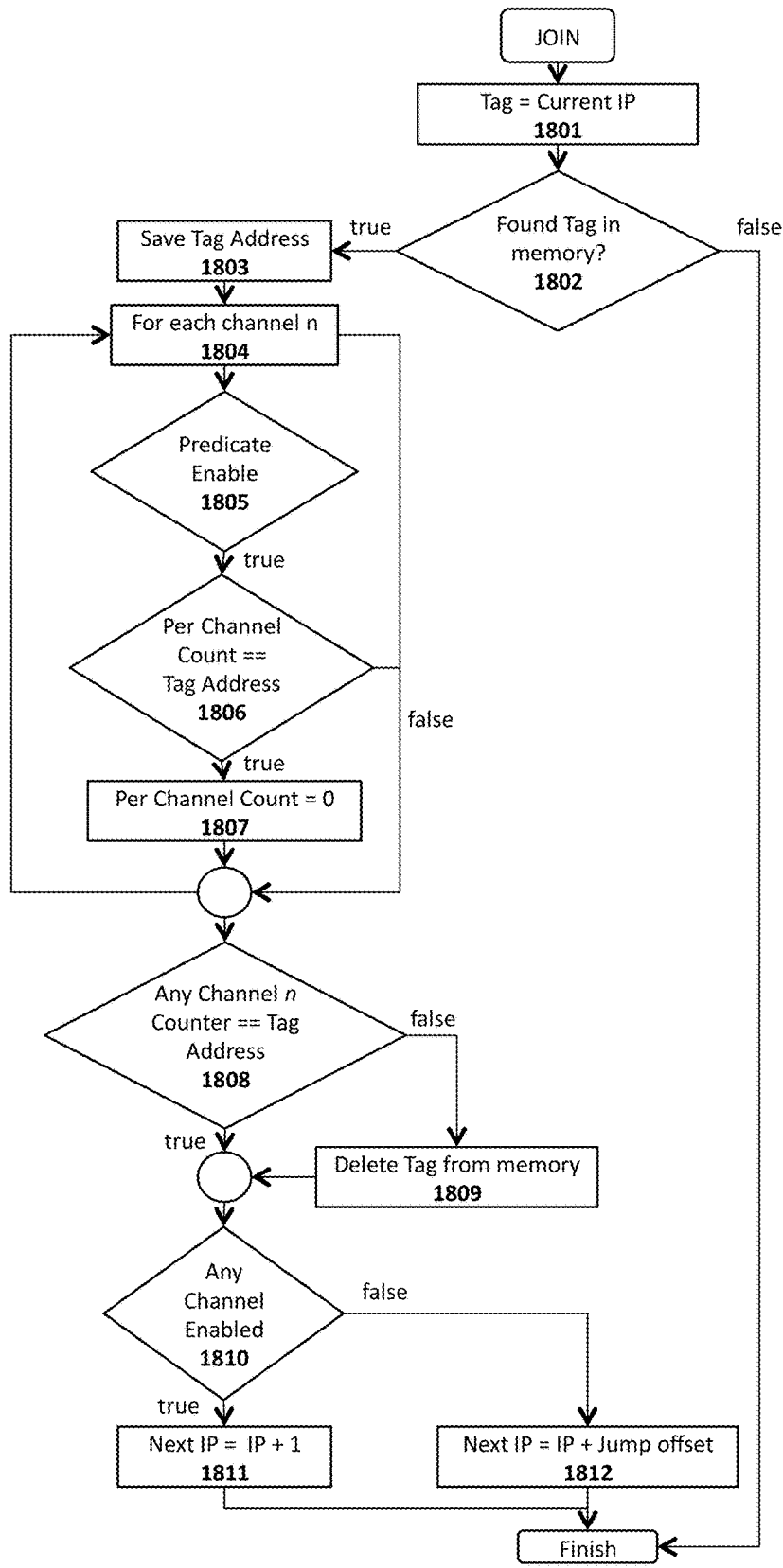
FIG. 18 illustrates a method for processing unstructured converging control flow instructions in accordance with one embodiment of the invention.

FIG. 18 illustrates one embodiment of a method for processing unstructured converging instructions. The method may be implemented within the context of the processor architecture shown in FIGS. 15-16 but is not limited to any particular architecture.

At 1801, the tag is set equal to the current instruction pointer. At 1802, the memory containing IP tags (e.g., sorted linked-list memory 1660) is searched using the tag. If a match is found, then the tag address is saved at 1803 (e.g., into a temporary storage such as a counter 1606 accessible by the unstructured control flow logic). At 1804, for each channel n, if the predicate enable bit is set (determined at 1805) and the per channel count is equal to the tag address (determined at 1806), then the per channel count is set equal to 0 at 1807 (thereby enabling the channel).

Once the process completes for each channel, at 1808 a determination is made as to whether any channel count is equal to the tag address. If not, then at 1809, the IP tag is deleted from memory. At 1810 a determination is made as to whether any channel is enabled. If so, then at 1811 the instruction pointer is incremented (i.e., the next instruction pointer is set to the current instruction pointer+1). If not, then at 1812 the next instruction pointer is set equal to the current instruction pointer added to the jump offset (i.e., to arrive at the IP for the next unstructured instruction).

As a result of the foregoing method, the current IP is searched for in memory. If it is found, then each Per Channel Count is compared to the memory address for channels with an enabled predicate mask bit. If these values match, the Per Channel Count is set to 0 (indicating an active channel). If all channels are enabled corresponding to a particular Control Instruction Count, then the Tag is removed from memory.

Efficient Support for Nested Branches on a GPU Architecture

Some single instruction multiple data (SIMD) architectures includes special IF, ELSE, and ENDIF control flow instructions to support SIMD branching. One such example is Intel's integrated graphics (GEN) instruction set architecture (ISA). In an IF/ELSE/ENDIF block, only channels that are enabled via predicate control execute the THEN block, while the disabled channels execute the ELSE block. Control flow re-converges at the ENDIF instruction, when the execution mask, which controls the active channels, is restored to be the same as before the IF instruction. Hardware may implement this by maintaining a global counter of the active divergent branches together with a set of per-channel counters that mark the first branch that disables this channel. For example, FIG. 12 (described above) illustrates a set of per-channel counters 1200-1202 and a global counter 1211 (referred to as a control instruction counter). The global counter 1211 is incremented at each divergent if instruction and decremented at its matching ENDIF. In one embodiment, each per-channel counter 1200-1202 is reset to zero if it is equal to the global counter to indicate re-convergence. The execution mask 1250 is formed by comparing each per-channel counter against the global counter.

This requires the number of IF and ENDIF instructions to be identical in a kernel, and thus means that for nested IF/ENDIF blocks that converge at the same program point, there are multiple redundant ENDIF instructions at the nested IF/ENDIF exit. The embodiments of the invention described below include a mechanism that allows a single ENDIF instruction to be generated in these situations, thereby both improving performance and reducing power.

One embodiment of the invention detects the presence of multiple consecutive control flow instructions such as ENDIFs in a kernel and fuses them into a single control flow instruction (e.g., a single ENDIF). A hardware stack may be added in one embodiment to keep track of the number of divergent IFs that map to an ENDIF. When hardware sees a (possibly fused) ENDIF, it may correctly restore the execution mask to that before the outermost IF for this ENDIF.

The embodiments of the invention described herein improve upon the known solutions by fusing back-to-back control flow instructions (e.g., ENDIFs) together for arbitrary level nests, thus avoiding the overhead of executing consecutive control flow instructions such as ENDIFs. This results in a 4% performance improvement for a 16 level deep IF-ENDIF nest in an OpenCL benchmark. These embodiments require modest hardware and software changes and can potentially benefit any GPU applications with divergent control flow.

While some of the embodiments of the invention described below are specifically directed to IF/ENDIF control flow instructions, the underlying principles of the invention may be implemented with other forms of control flow instructions.

Figure 19:
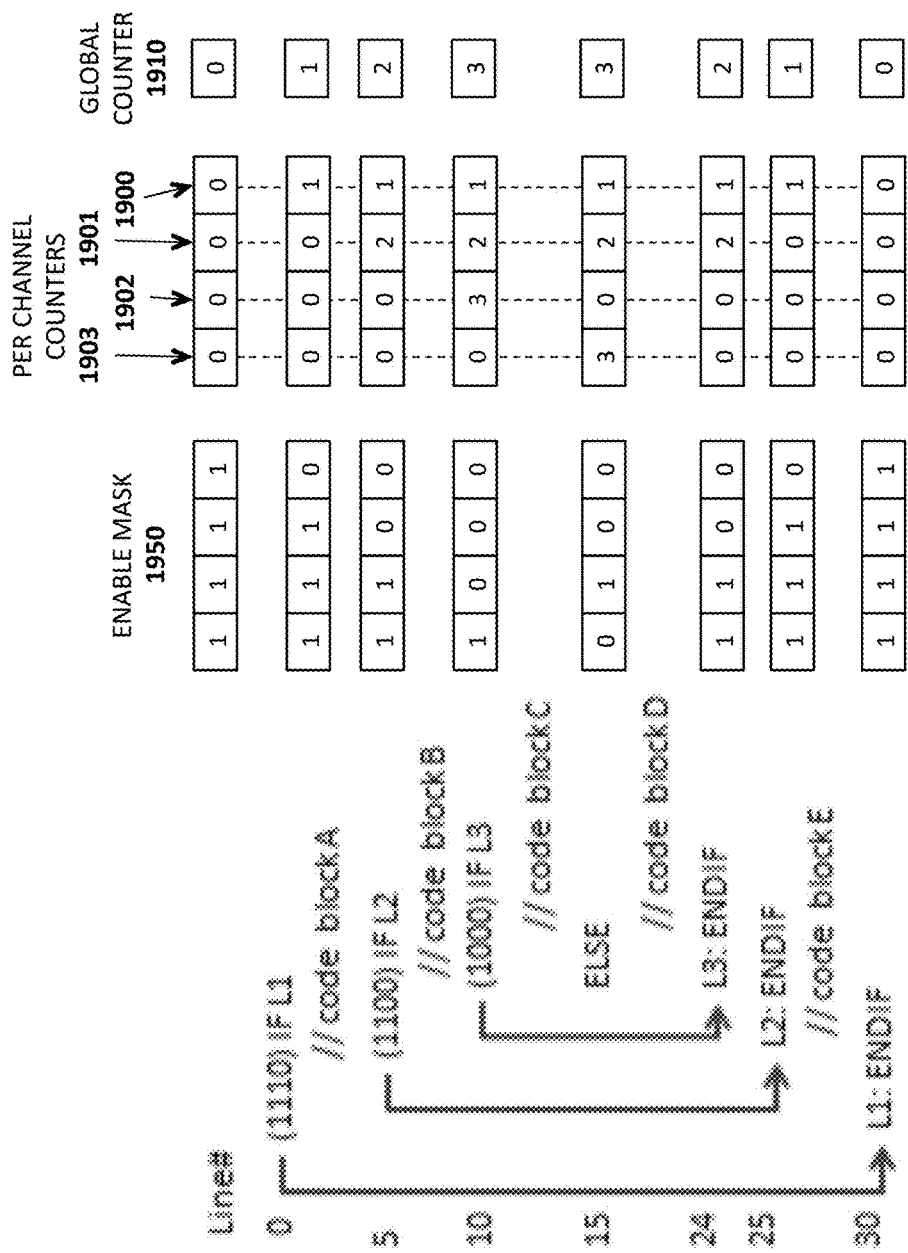
FIG. 19 illustrates the operation of one embodiment which does not rely on fused control flow instructions.

FIG. 19 illustrates exemplary program code containing three sets of IF/ENDIF instructions. The parenthesized bits before the IF instruction are the predicate values, and each IF matches with its corresponding ENDIF via a unique label (L1, L2, L3 in the illustrated example). For the purpose of this demonstration the number of SIMD channels is set to 4, but the underlying principles of the invention can be applied to IF/ELSE/ENDIF blocks with arbitrary SIMD widths and nest levels.

In the illustrated embodiment, the global counter 1910 records the number of active divergent branches at the current program point. Thus, the global counter starts at 0, increments to 1 in response to IF L1, increments to 2 in response to IF L2 and increments to 3 in response to IF L3, as illustrated. It then decrements from 3 to 2 in response to ENDIF L3, decrements to 1 in response to ENDIF L2, and finally decrements back to 0 in response to the final ENDIF L1.

As illustrated, each channel also has its own counter to track the divergent branch that first disables the channel. Because the illustrated example uses four SIMD channels, four per-channel counters 1900-1904 are illustrated in FIG. 19. The counters are incremented to indicate the current nesting level associated with each IF/ELSE instruction which may be determined from the global counter (i.e., in response to an IF/ELSE, the relevant per-channel counter may be set equal to the global counter as illustrated). In response to and ENDIF, each per-channel counter storing the value of the corresponding IF/ELSE may be reset to 0. For example, in FIG. 19, per-channel counter 1900 is set equal to the global counter value of 1 in response to IF L1; per-channel counter 1901 is set equal to the global counter value of 2 in response to IF L2; and per-channel counter 1902 is set equal to the global counter value of 3 in response to IF L3. In response to the ELSE instruction (i.e., if the IF condition is not true), per-channel counter 1903 is set equal to the global counter value of 3. Then, in response to the first ENDIF (L3), the global counter value is 2 so any per-channel counter value greater than 3 (e.g., counter 1903 or 1902) is reset to 0. On the next ENDIF (L2), any per-channel counter value greater than the global counter value of 1 is reset to 0 (i.e., counter 1901). For the final ENDIF (L1), the global counter value is 1, so all per-channel counters are reset to 0. As mentioned above, the channel enable mask 1950 is set based on the per-channel counter values. Any per-channel counter with a value greater than 0 sets its corresponding channel enable mask bit to 0 (disabled). Otherwise, the corresponding channel enable mask bit is set to 1 (enabled).

In one embodiment, the counters are updated according to the following rules:

```
global_counter = 0, counter[I] = 0 for all channels at program start
On divergent IF:
    global_counter++;
    If channel I is disabled by IF
        counter[I] = global_counter
On divergent ELSE:
    If counter[I] == 0
        counter[I] = global_counter
    Else if counter[I] == global_counter
        counter[I] = 0
On divergent ENDIF:
    global_counter--;
    If counter[I] > global_counter
        counter[I] = 0
```

Note that the counters are not updated at a uniform branch, since either the THEN block or the ELSE block will be skipped and the execution mask does not need to be restored at the ENDIF. The execution mask is formed by Emask[I]=counter[I]==0

Figure 20:
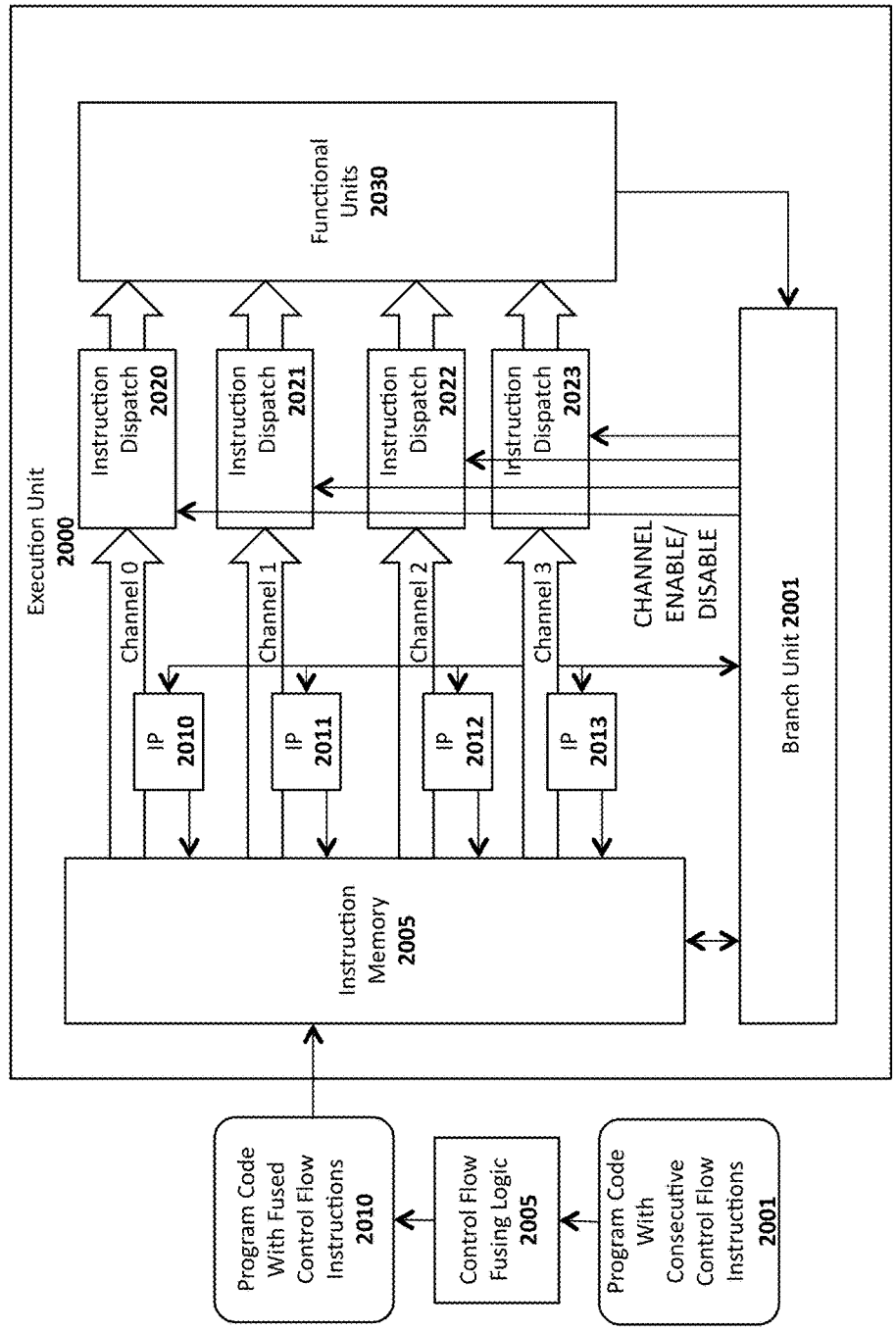
FIG. 20 illustrates one embodiment of the invention in which fusing logic fuses control flow instructions.

One embodiment of the invention further improves upon the above solution by combining any back-to-back control flow instructions (e.g., ENDIFs). In particular, as illustrated in FIG. 20, one embodiment includes control flow fusing logic 2005 which detects multiple consecutive control flow instructions such as ENDIFs (L2 and L3 in the above example) within program code 2001, and generates program code 2010 in which the consecutive control flow instructions are fused into a single control flow instruction. In one embodiment, the labels of the divergent control flow instructions (e.g., IFs) corresponding to the converging control flow instructions (e.g., ENDIFs) are also updated to all point to the fused instruction as described below (see, e.g., FIG. 22 and associated text).

The other components shown in FIG. 20 may operate substantially as described above (aside from the branch unit 2001 which may include additional logic for processing the fused control flow instructions as described herein). In particular, FIG. 20 illustrates an architecture for an execution unit 2000 in which a branch unit 2001 is implemented in accordance with one embodiment of the invention. Four channels 0-3 execute instructions stored in an instruction memory 2005 which may be an instruction buffer, instruction cache or any other memory suitable for storing instructions prior to execution. While four channels are illustrated in FIG. 20, the underlying principles of the invention may be implemented with any number of channels. An instruction pointer 2010-2013 associated with each channel 0-3, respectively, identifies the next instruction to be executed over its respective channel. Instruction dispatch logic 2020-2023 then dispatches the instructions for execution on a plurality of functional units 2030, which may include, for example, vector functional units, scalar functional units, and logical functional units (and/or any other type of functional unit designed to execute the instructions).

The execution unit 2000 shown in FIG. 20 may be implemented within a graphics processing unit architecture such as described above (see, e.g., execution units 608 shown in FIG. 6). However, the underlying principles of the invention are not limited to a graphics processing implementation.

As mentioned above, channel divergence and convergence are detected by the branch unit 2001 which responsively enables and disables each channel as described herein. The branch unit 2001 may be shared across all threads in the EU 2000 and may compute the result of all control flow instructions for all channels in the processor. In one embodiment, each thread is executed on a different channel 0-3.

Figure 21:
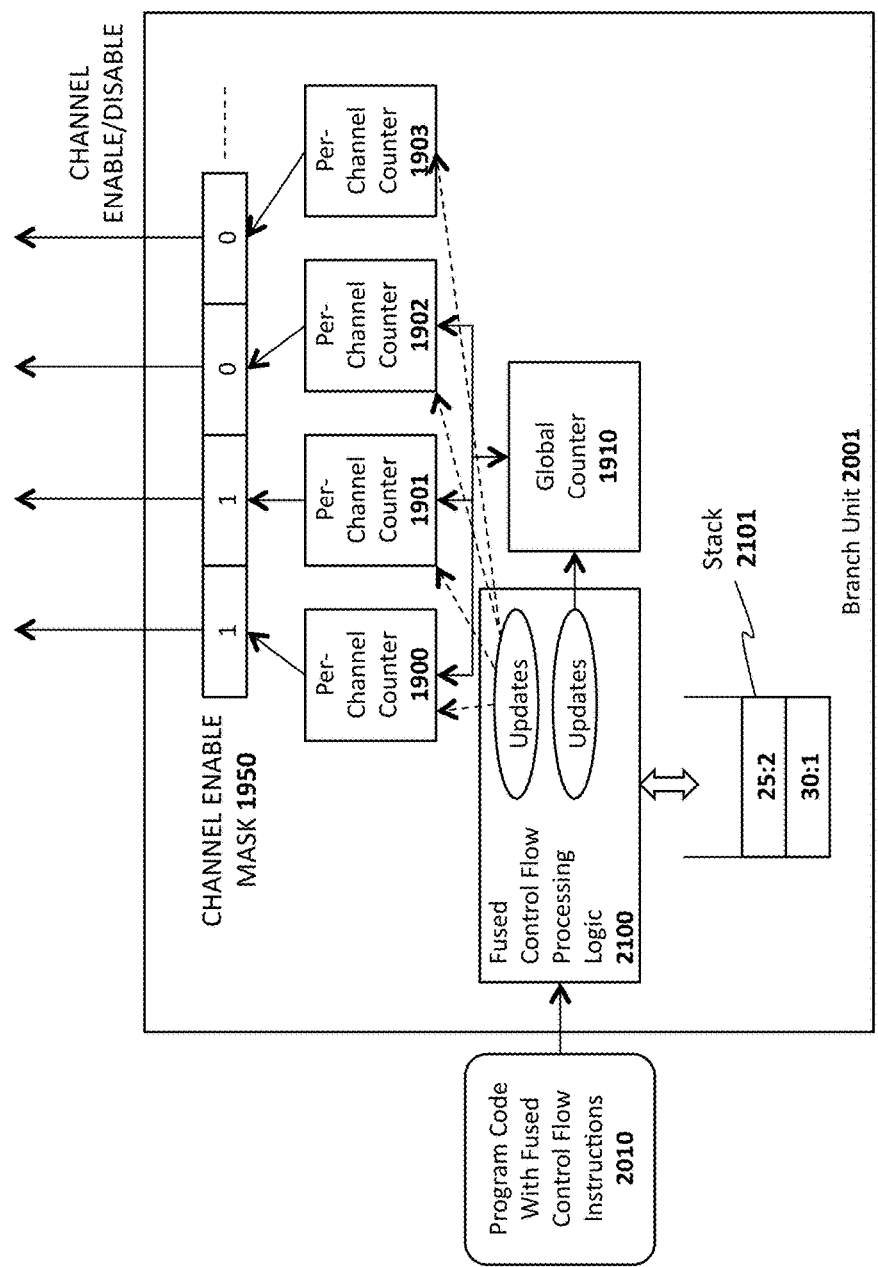
FIG. 21 illustrates one embodiment of a branch unit including fused control flow instruction processing logic for processing fused control flow instructions.

FIG. 21 illustrates additional details of one embodiment of the branch unit 2101 including the set of per-channel counters 1900-1903 maintaining a count representing the current level of IF/ELSE/ENDIF nesting and responsively updating the channel enable mask 1950. As mentioned, each bit in the channel enable mask indicates whether its corresponding channel is enabled (1) or disabled (0). If the value in a per-channel counter is 0, then the corresponding channel enable mask bit is set to 1 (to indicate the channel is enabled). If the value in the per-channel counter is greater than 0, then the corresponding channel enable mask bit is set to 0 (to indicate that the channel is disabled). As discussed above, the per-channel counters 1900-1903 may be modified based on comparisons against the current value in the global counter 1910. In one embodiment, fused control flow processing logic 2100 processes the program code with fused control flow instructions 2010 (e.g., ENDIFs) to update the per-channel counters 1900-1903 and global counter 1910 as described herein. In hardware, a stack 2101 is added to record the control flow instructions of active divergent branches, and each control flow instruction on the stack additionally has a counter to store the number of diverging control flow instructions (e.g., IFs) that match the converging control flow instructions (e.g., ENDIFs).

Figure 22:
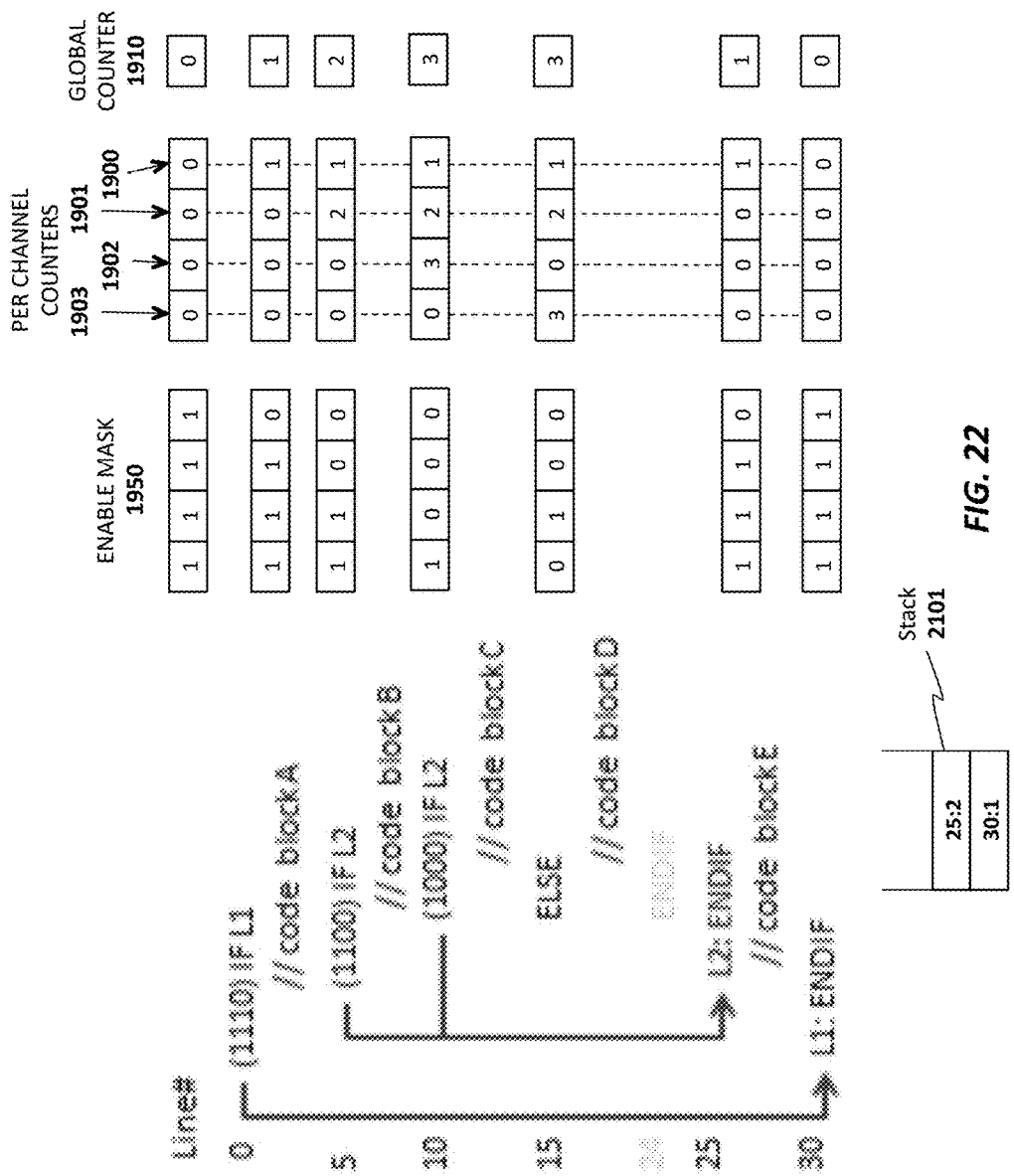
FIG. 22 illustrates the operation of one embodiment of the invention in which a particular type of control flow instructions (ENDIF) are fused.

FIG. 22 provides an example of how fused ENDIFs may be processed in accordance with one embodiment of the invention. In this example, the ENDIF L3 and ENDIF L2 from FIG. 19 have been fused into a single ENDIF L2. As in FIG. 19, the first IF L1 increments the global counter 1910 to 1 and sets the per-channel counter 1900 to 1 for the associated channel. The enable mask 1950 bit for this channel is then set to 0 (indicating that the channel is disabled). The next IF L2 increments the global counter 1910 to 2 and sets a value of 2 in the corresponding per-channel counter 1901, thereby causing the enable mask 1950 bit for this channel to be set to 0. The third IF statement also has the L2 label since the L2 and L3 ENDIFs were fused. It sets the global counter 1910 and the corresponding per-channel counter 1902 to 3, thereby disabling the channel. Alternatively, the ELSE instruction may set per-channel counter 1903 and global counter to 3, as illustrated.

In contrast to the embodiment shown in FIG. 19, in FIG. 22, a single ENDIF L2 decrements the global counter by 2 (from 3 to 1) and, in response, all values in the per-channel counters greater than 1 are reset to 0 (all but per-channel counter 1900 which remains at a value of 1 in the example). Thus, a single ENDIF instruction provides the same end result as two separate ENDIF instructions in the prior embodiments. In one embodiment, the stack 2101 is consulted to determine the number of divergent IFs mapped to each ENDIF. Because the ENDIF L2 (identified in the stack at line #25) has two divergent IFs mapped to it (as indicated by 25:2 in the stack), the global counter is decremented by 2 (i.e., from 3 to 1). By contrast, the second ENDIF L1 is associated in the stack 2101 with a single IF (as indicated by 30:1). As such the global counter is decremented from 1 to 0 and the associated per-channel counter 1900 is reset to 0, as illustrated.

In one embodiment, the below rules are used to compute the counters, with pertinent updates bolded to contrast with the prior embodiments:

```
global_counter = 0, counter[I] = 0, endif_stack = empty at program start
On divergent IF:
    global_counter++;
    If channel I is disabled by IF
        counter[I] = global_counter
    If label == endif_stack.top( ).label
        endif_stack.top( ).counter++
    else
        endif_stack.push(endif_label, 1)
On divergent ELSE:
    If counter[I] == 0
        counter[I] = global_counter
    Else if counter[I] == global_counter
        counter[I] = 0
On divergent ENDIF:
    global_counter -= endif_stack.top( ).counter
    endif_stack.pop( )
    If counter[I] > global_counter
        counter[I] = 0
```

Thus, the embodiments of the invention ensure that on an ENDIF, the global counter 1910 is decremented by the number of IFs that map to it. While the example shown in FIG. 22 uses two fused ENDIFs for the purpose of explanation, the underlying principles of the invention may be implemented with a larger number of fused ENDIFs. To reduce the number of bits needed for the stack 2101 counter, ENDIF fusing may be disabled when the number of consecutive ENDIFs exceeds a predetermined threshold. For example, the stack counter may be limited to 3 bits and the number of fused ENDIFs may be set to 8. In one embodiment, the stack 2101 depth is bounded by the maximum number of divergent branches and must therefore be at most the SIMD width, since at least one channel must be disabled for each such IF.

Figure 23:
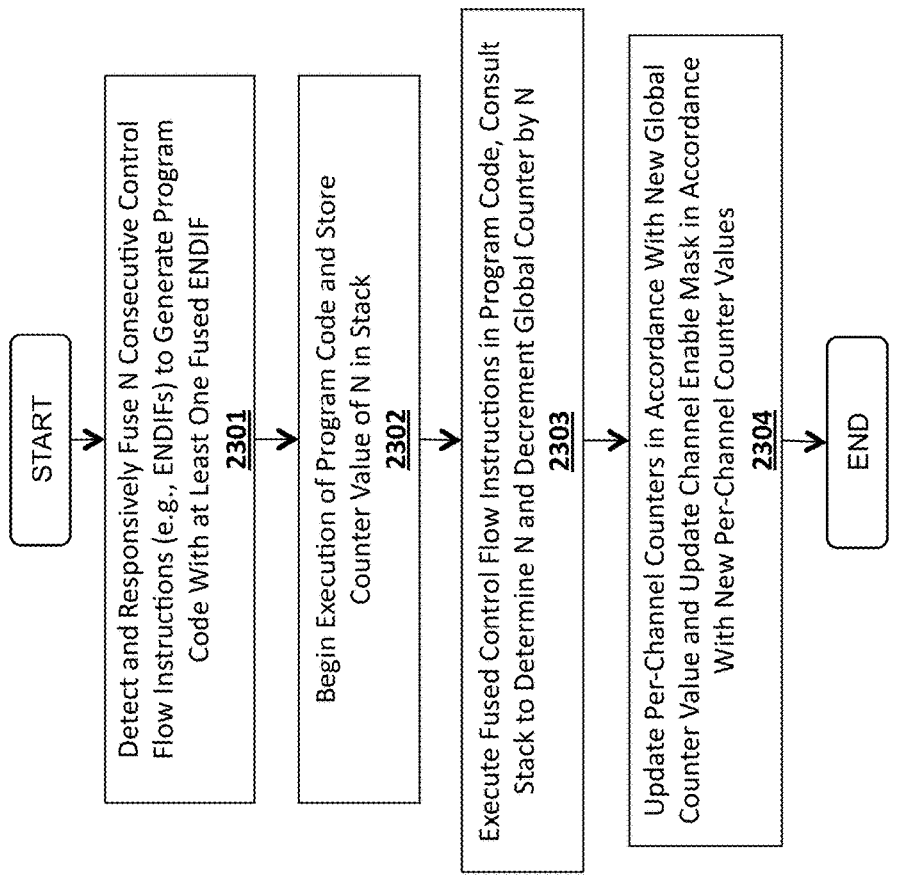
FIG. 23 illustrates a method in accordance with one embodiment of the invention.

A method in accordance with one embodiment of the invention is illustrated in FIG. 23. The method may be implemented within the context of the architectures described above, but is not limited to any particular architecture.

At 2301, N consecutive control flow instructions (e.g., ENDIFs) are detected within program code and, in response, the control flow instructions are fused to generate program code containing the fused control flow instructions. In one particular embodiment, the fused control flow instructions are converging control flow instructions such as ENDIFs. As mentioned, the operation of fusing the control flow instructions may be performed by software (e.g., a compiler or kernel). However, the underlying principles of the invention are not limited to a software-based implementation.

At 2302, the program code is executed and a counter value of N is stored in a stack and associated with the fused control flow instruction. As mentioned, the control flow instruction may be identified with a label (e.g., a line #). At 2303, the fused control flow instruction is executed and, in response, the stack is consulted to determine the value of N. The global counter is then decremented by N. At 2304, the per channel counters are updated in accordance with the new global counter value (e.g., per-channel counters greater than the global counter may be set to 0 as described above). In addition, the channel enable mask may be updated in accordance with the new per-channel counter values as described herein (e.g., enabling channels with a per-channel counter value of 0).

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
   an execution unit having a plurality of channels to execute control flow instructions including fused control flow instructions comprising two or more consecutive control flow instructions fused into a single fused control flow instruction; and
   a branch unit to process the control flow instructions and to maintain a global counter indicating a nesting level of the control flow instructions, wherein to process a fused control flow instruction, the branch unit is to store a value N in a stack indicating a number of control flow instructions fused into the fused control flow instruction, the branch unit to subsequently read the value N from the stack upon execution of the fused control flow instruction and decrement the global counter by a value of N responsive to execution of the fused control flow instruction.

2. The processor as in claim 1 wherein the branch unit is to further maintain a per-channel count value for each of the plurality of channels, the per-channel count value to indicate whether each corresponding channel is enabled or disabled.

3. The processor as in claim 2 wherein the branch unit is to compare the per-channel count value to the global counter value and reset any per-channel counters having a value greater than the global counter value to 0.

4. The processor as in claim 3 wherein the branch unit is to generate a channel enable mask comprising a bit associated with each channel to indicate whether the channel is enabled or disabled, the bits of the channel enable mask to be set based on the values in the corresponding per-channel counters.

5. The processor as in claim 1 wherein the fused control flow instruction comprises a fused ENDIF instruction generated by fusing N consecutive ENDIF instructions.

6. The processor as in claim 1 wherein the stack comprises a stack counter to store the value N associated with the fused control flow instruction, wherein a threshold number of consecutive control flow instructions capable of being fused is set based on a number of bits used for the stack counter.

7. The processor as in claim 6 wherein the stack counter comprises three bits and the threshold number of consecutive control flow instructions capable of being fused comprises eight.

8. The processor as in claim 7 wherein the stack comprises a depth which is bounded by a maximum number of divergent branches comprising a single instruction multiple data (SIMD) width of the processor.

9. The processor as in claim 1 wherein the execution unit comprises one of a plurality of execution units within a graphics processing unit (GPU).

10. The processor as in claim 1 wherein a software kernel and/or compiler is to analyze the control flow instructions and to fuse the consecutive control flow instructions to generate the fused control flow instruction.

11. A method comprising:
fusing two or more consecutive control flow instructions into a single fused control flow instruction;
processing a sequence of control flow instructions including the fused control flow instruction and maintaining a global counter indicating a nesting level of the control flow instructions, wherein to process the fused control flow instruction:
storing a value N in a stack indicating a number of control flow instructions fused into the fused control flow instruction,
subsequently reading the value N from the stack upon execution of the fused control flow instruction and decrementing the global counter by a value of N responsive to execution of the fused control flow instruction.

12. The method as in claim 11 wherein the branch unit is to further maintain a per-channel count value for each of the plurality of channels, the per-channel count value to indicate whether each corresponding channel is enabled or disabled.

13. The method as in claim 12 wherein the branch unit is to compare the per-channel count value to the global counter value and reset any per-channel counters having a value greater than the global counter value to 0.

14. The method as in claim 13 wherein the branch unit is to generate a channel enable mask comprising a bit associated with each channel to indicate whether the channel is enabled or disabled, the bits of the channel enable mask to be set based on the values in the corresponding per-channel counters.

15. The method as in claim 11 wherein the fused control flow instruction comprises a fused ENDIF instruction generated by fusing N consecutive ENDIF instructions.

16. The method as in claim 11 wherein the stack comprises a stack counter to store the value N associated with the fused control flow instruction, wherein a threshold number of consecutive control flow instructions capable of being fused is set based on a number of bits used for the stack counter.

17. The method as in claim 16 wherein the stack counter comprises three bits and the threshold number of consecutive control flow instructions capable of being fused comprises eight.

18. The method as in claim 17 wherein the stack comprises a depth which is bounded by a maximum number of divergent branches comprising a single instruction multiple data (SIMD) width of a processor.

19. The method as in claim 11 implemented within an execution unit of a graphics processing unit (GPU).

20. The method as in claim 11 wherein a software kernel and/or compiler is to analyze the control flow instructions and to fuse the consecutive control flow instructions to generate the fused control flow instruction.

* * * * *